United States Patent
Mansoor et al.

(10) Patent No.: US 12,436,497 B2
(45) Date of Patent: Oct. 7, 2025

(54) SYSTEM AND A METHOD FOR IMAGING USING LENS-LESS HOLOGRAPHIC MICROSCOPY

(71) Applicant: METROLASER, INC., Laguna Hills, CA (US)

(72) Inventors: Mohammad Mujtaba Mansoor, Irvine, CA (US); Jian Gao, Rancho Mission Viejo, CA (US); James Davis Trolinger, Costa Mesa, CA (US); Jacob George, Downey, CA (US)

(73) Assignee: METROLASER, INC., Laguna Hills, CA (US)

( * ) Notice: Subject to any disclaimer, the term of this patent is extended or adjusted under 35 U.S.C. 154(b) by 4 days.

(21) Appl. No.: 18/606,848

(22) Filed: Mar. 15, 2024

(65) Prior Publication Data

US 2025/0291314 A1   Sep. 18, 2025

(51) Int. Cl.
  G03H 1/00    (2006.01)
  G03H 1/04    (2006.01)
  (Continued)

(52) U.S. Cl.
  CPC ......... G03H 1/0005 (2013.01); G03H 1/0443 (2013.01); H04N 23/56 (2023.01);
  (Continued)

(58) Field of Classification Search
  CPC .............. G03H 1/0005; G03H 1/0443; G03H 2001/005; G03H 2001/045;
  (Continued)

(56) References Cited

U.S. PATENT DOCUMENTS

| 3,578,845 A | 5/1971 | Brooks et al. |
| 9,357,202 B2 * | 5/2016 | Pavani ............... G02B 30/54 |

(Continued)

OTHER PUBLICATIONS

Zhang et al. "Resolution and sampling analysis in digital in-line holography with spherical wave illumination", Optical Engineering, Dec. 2019.*

*Primary Examiner* — James T Boylan
(74) *Attorney, Agent, or Firm* — .Haynes and Boone, LLP

(57) ABSTRACT

A lens-less system for holographic imaging or a holographic imaging device is provided. The method/device includes a stationary image sensor to capture an image of a sample illuminated by light from a stationary illumination source. A reference lens-less holographic image may be captured and used as a base line to reduce image artifacts and/or remove noise from the lens-less holographic image. Since real wavefronts produced by a diverging point source are neither perfectly spherical nor planar but a combination of both qualities, theoretical estimates for wavefront reconstruction based on perfectly planar or spherical incident waves cannot be applied accurately. The method/device here provides a solution by performing a calibrated wavefront reconstruction based on equations governing coherent light propagation for both spherical waves and planar waves with a mathematical correlation between numerical magnification and propagation depth to produce accurate three-dimensional details of the object.

18 Claims, 10 Drawing Sheets

(51) Int. Cl.
*H04N 23/56* (2023.01)
*H04N 23/81* (2023.01)

(52) U.S. Cl.
CPC ....... *H04N 23/81* (2023.01); *G03H 2001/005* (2013.01); *G03H 2001/045* (2013.01); *G03H 2210/55* (2013.01); *G03H 2222/52* (2013.01); *G03H 2226/02* (2013.01)

(58) Field of Classification Search
CPC .......... G03H 2210/55; G03H 2222/52; G03H 2226/02; H04N 23/56; H04N 23/81
USPC .......................................................... 348/40
See application file for complete search history.

(56) References Cited

U.S. PATENT DOCUMENTS

| | | | |
|---|---|---|---|
| 10,488,820 B2 * | 11/2019 | Matsuo | G02B 5/1809 |
| 11,175,627 B2 * | 11/2021 | Haeffele | G03H 1/0866 |
| 2012/0218379 A1 * | 8/2012 | Ozcan | G03H 1/06 |
| | | | 348/40 |
| 2018/0080760 A1 * | 3/2018 | Allier | G06T 7/0012 |
| 2019/0011882 A1 * | 1/2019 | Gusyatin | G01N 15/1433 |
| 2019/0086864 A1 * | 3/2019 | Watanabe | G03H 1/0443 |
| 2020/0340908 A1 * | 10/2020 | Cornelis | G03H 1/0443 |
| 2022/0011722 A1 | 1/2022 | Gusyatin | |
| 2024/0385099 A1 * | 11/2024 | Prisbey | G03H 1/2645 |

* cited by examiner

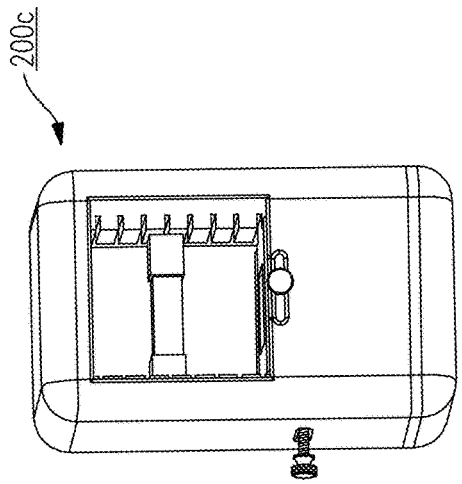
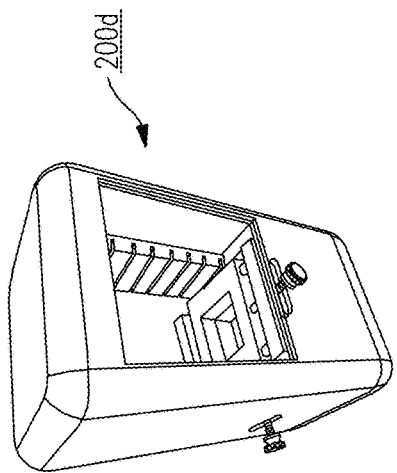
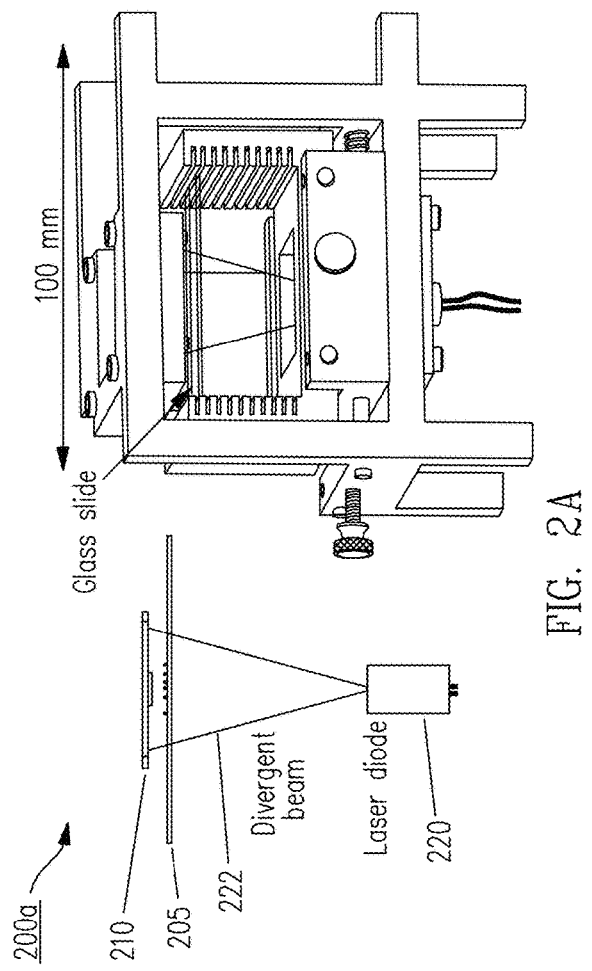
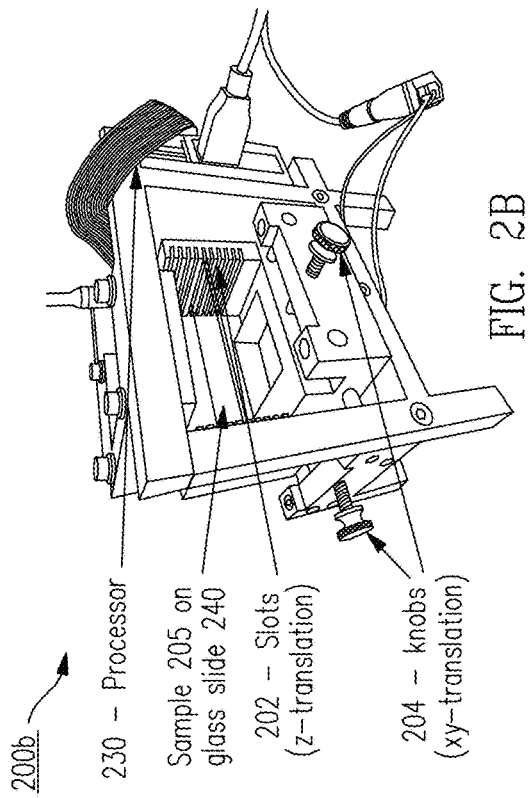

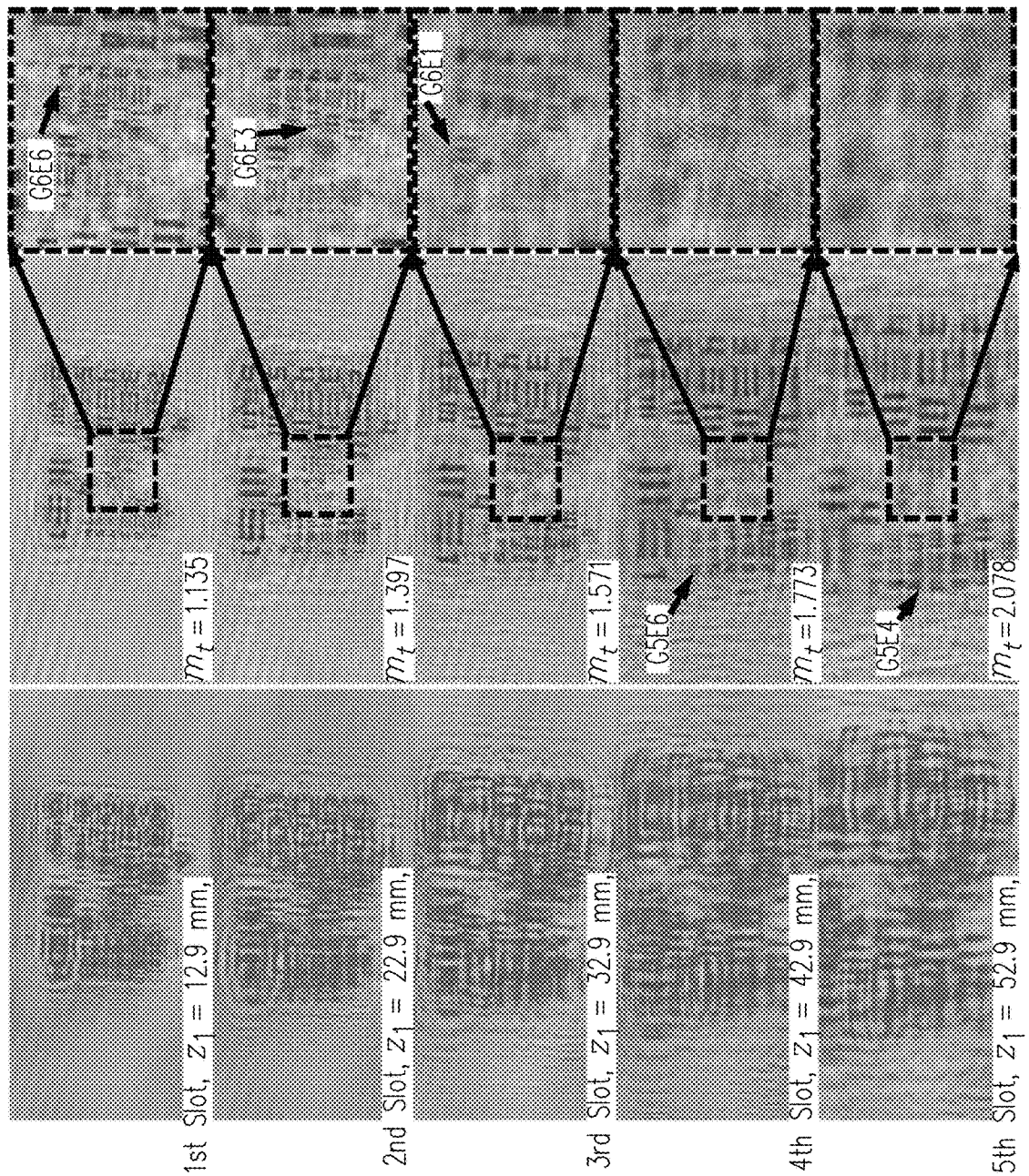

| | Spherical wave algorithm magnification ($m_n$) | Planar wave algorithm magnification ($m_n$) | True magnification ($m_t$) |
|---|---|---|---|
| 1st slot, $z_1$ = 12.9 mm | 0.288 | 1.01 | 1.1354 |
| 2nd slot, $z_1$ = 22.9 mm | 0.412 | 1.075 | 1.397 |
| 3rd slot, $z_1$ = 32.9 mm | 0.506 | 1.143 | 1.5711 |
| 4th slot, $z_1$ = 42.9 mm | 0.587 | 1.219 | 1.7726 |
| 5th slot, $z_1$ = 52.9 mm | 0.662 | 1.323 | 2.078 |

FIG. 5

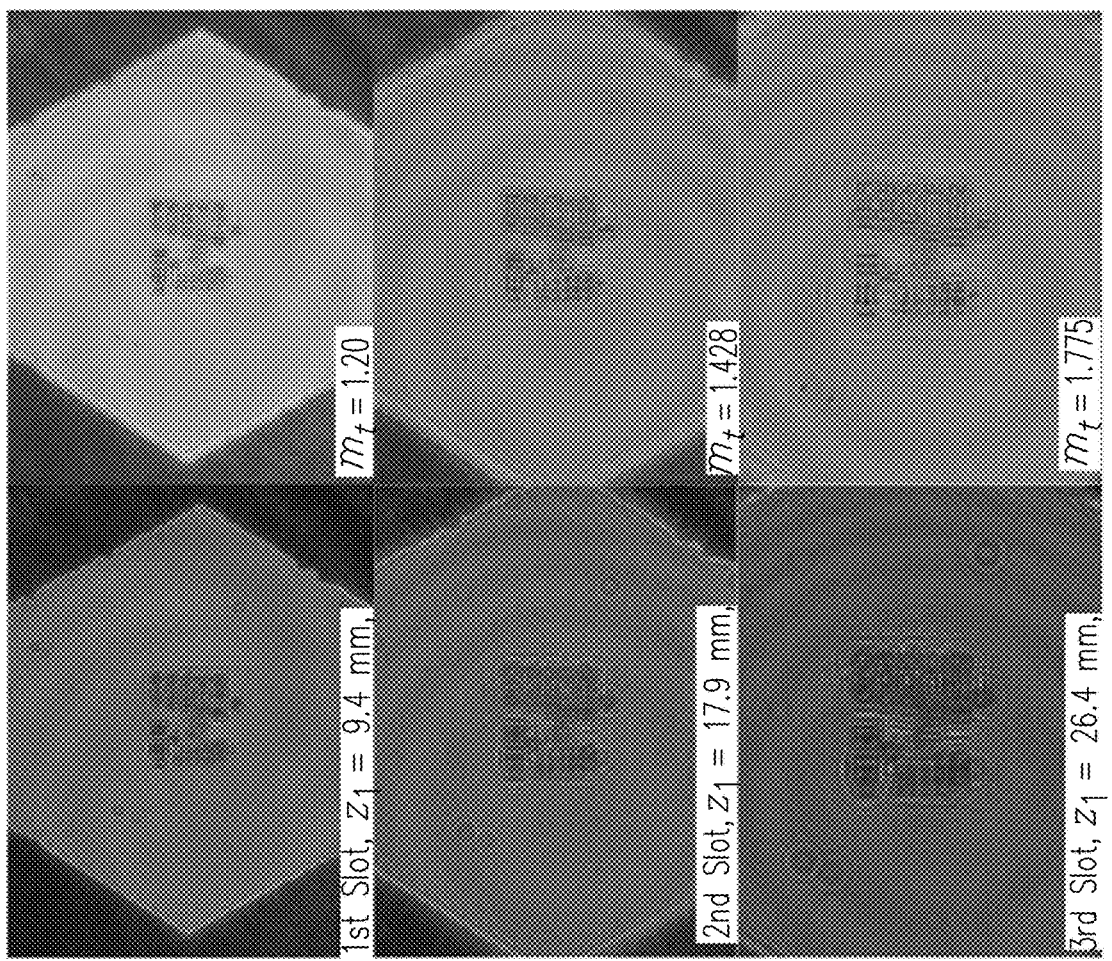
FIG. 8A
FIG. 8B
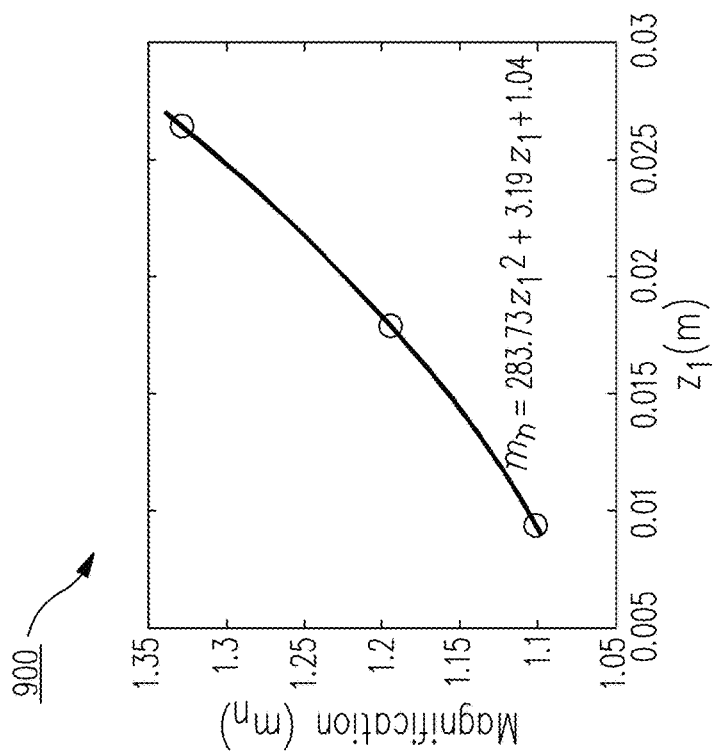
FIG. 9

SYSTEM AND A METHOD FOR IMAGING USING LENS-LESS HOLOGRAPHIC MICROSCOPY

GOVERNMENT SPONSORED RESEARCH

The present disclosure includes work commenced with the support from a Department of Energy (DOE) SBIR Phase II contract entitled "A New Digital Holographic Microscope for the Study of Biological Systems," Contract DE-SC00020527. The government has certain rights in the invention.

FIELD OF INVENTION

Embodiments of the present disclosure relate generally to a holographic imaging device, and more particularly, for example, to a lens-less holographic imaging device and methods for holographic imaging via calibrated wavefront reconstructions using spherical and/or plane wave approximations.

BACKGROUND

Until recently, producing holograms requires expensive optical equipment, photographic materials, chemical processing, and more importantly, a unique understanding centered on highly relevant technical skills in optical physics. With the emergence of digital cameras, digital holography revolutionized holography and many of its applications, bypassing most of the required tools listed above. However, the need for special optical equipment remains since digital cameras still use complex optics to produce holographic images. There is thus a need for an advanced holographic imaging device that includes less hardware, or without the traditionally needed complex optical components, to produce holograms. This is also a need for advanced theoretical considerations that acknowledge both imperfectly planar and spherical wave properties of real-world wavefronts to enable more accurate reconstructions.

SUMMARY

In accordance with one or more embodiments, a lens-less system for holographic imaging is provided. The system may include a stationary image sensor configured to capture an image of a sample comprising an object of interest, the stationary image sensor being located at an object-sensor distance $z_1$ (also referred to as sample-sensor distance $z_1$) from the sample on a first side of the sample; a stationary illumination source configured to illuminate the sample positioned at an object-source distance $z_2$ (also referred to as sample-source distance $z_2$) from the sample on a second side opposite the first side of the sample, wherein the stationary image sensor captures a lens-less holographic image of the object illuminated with light originating from the stationary illumination source; and a processor configured to perform wavefront reconstruction of the lens-less holographic image of the sample to produce three-dimensional details of the object. In one or more embodiments, the three-dimensional details of the object may include edgelines, shape, size, geometry, morphology, phase, and location of the object within the sample.

In one or more embodiments, the sample may be disposed on a substrate, and the stationary illumination source is located closer to the substrate than the sample. In one or more embodiments, the stationary image sensor may capture a reference lens-less holographic image of the light originating from the stationary illumination source, and the reference lens-less holographic image is then used as a base line to reduce image artifacts and/or remove noise from the lens-less holographic image of the sample.

In one or more embodiments, the sample may be disposed within a container, and the stationary image sensor captures a reference lens-less holographic image of the container without the sample. In such embodiments, the reference lens-less holographic image may be used as a base line to reduce image artifacts and/or remove noise from the lens-less holographic image of the sample.

In one or more embodiments, the stationary illumination source may include a coherent light source configured to produce a divergent coherent light, wherein the divergent coherent light may be scattered by the object of interest in the sample to produce scattered light, which interferes with the undisturbed (un-scattered) divergent coherent light to produce interference patterns, and the lens-less holographic image of the sample captured by the stationary image sensor may include the interference patterns.

In one or more embodiments, the object-source distance $z_2$ is much greater than object-sensor distance $z_1$. In one or more embodiments, a ratio of the object-sensor distance $z_1$ to the object-source distance $z_2$ ranges between 0.01 and 1 or within 10-30 percent of 0.1, 0.2, 0.3, 0.4, or 0.5.

In one or more embodiments, the processor may be further configured to apply equations governing coherent light propagation for either spherical waves or planar waves in a reconstruction of the interference patterns in producing the three-dimensional details of the object. In one or more embodiments, the processor may be further configured to apply equations governing coherent light propagation for both spherical waves and planar waves in a reconstruction of the interference patterns in producing the three-dimensional details of the object.

In one or more embodiments, the processor may be further configured to apply a depth calibration based on a mathematical correlation between numerical magnification $m_n$ and the object-sensor distance $z_1$ that is specific to the use of either spherical wave or planar wave reconstruction algorithm and a location of the stationary image sensor and a location of the stationary illumination source with respect to the sample.

In accordance with one or more embodiments, a method of imaging is provided. The method may include illuminating a sample comprising an object via a stationary illumination source positioned at an object-source distance $z_2$ from the sample on a first side of the sample; capturing a lens-less holographic image of the sample illuminated with light originating from the stationary illumination source via a stationary image sensor positioned at an object-sensor distance $z_1$ from the sample on a second side opposite the first side of the sample; and performing wavefront reconstruction of the lens-less holographic image of the sample to produce three-dimensional details of the object. In one or more embodiments, the three-dimensional details of the object may include edgelines, shape, size, geometry, morphology, phase, and location of the object within the sample.

In one or more embodiments of the method, the sample may be disposed on a substrate, and wherein the stationary illumination source is located closer to the substrate than the sample.

In one or more embodiments, the method may further include capturing a reference lens-less holographic image of the light originating from the stationary illumination source and applying the reference lens-less holographic image as a base line to reduce image artifacts and/or remove noise from the lens-less holographic image of the sample.

In one or more embodiments, the sample may be disposed within a container, and the method may further include capturing a reference lens-less holographic image of the container without the sample and applying the reference lens-less holographic image as a base line to reduce image artifacts and/or remove noise from the lens-less holographic image of the sample.

In one or more embodiments, the stationary illumination source may include a coherent light source configured to produce a divergent coherent light, wherein the divergent coherent light may be scattered by the object of interest in the sample to produce scattered light, which interferes with the undisturbed (un-scattered) divergent coherent light to produce interference patterns, and the lens-less holographic image of the sample captured by the stationary image sensor may include the interference patterns.

In one or more embodiments of the method, the object-source distance $z_2$ is much greater than the object-sensor distance $z_1$, or a ratio of the object-sensor distance $z_1$ to the object-source distance $z_2$ ranges between 0.01 and 1 or within 10-30 percent of 0.1, 0.2, 0.3, 0.4, or 0.5.

In one or more embodiments, performing the wavefront reconstruction of the lens-less holographic image of the sample may include applying equations governing coherent light propagation for either spherical waves or planar waves in a reconstruction of the interference patterns in producing the three-dimensional details of the object. In one or more embodiments, performing the wavefront reconstruction of the lens-less holographic image of the sample may include applying equations governing coherent light propagation for both spherical waves and planar waves in a reconstruction of the interference patterns in producing the three-dimensional details the object.

In one or more embodiments, performing the wavefront reconstruction of the lens-less holographic image of the sample may further include applying a depth calibration based on a mathematical correlation between numerical magnification $m_n$ and the object-sensor distance $z_1$ that is specific to the use of either spherical wave or planar wave reconstruction algorithm and a location of the stationary image sensor and a location of the stationary illumination source with respect to the sample.

In accordance with one or more embodiments, a holographic imaging device is provided. The holographic imaging device may include a stationary illumination source configured to illuminate a sample comprising an object, the stationary illumination source positioned at an object-source distance $z_2$ from the sample on a first side of the sample; and a stationary imaging module configured to capture a lens-less holographic image of the sample illuminated with light originating from the stationary illumination source, the stationary imaging module being located at an object-sensor distance $z_1$ from the sample on a second side opposite the first side of the sample, wherein the stationary imaging module may be further configured to produce a holographic image of the object in three-dimensional details reconstructed based on the lens-less holographic image of the sample. In one or more embodiments, the three-dimensional details may include edgelines, shape, size, geometry, morphology, phase, and location of the object within the sample.

In one or more embodiments, the stationary imaging module may be further configured to capture a reference lens-less holographic image of the light originating from the stationary illumination source, and the reference lens-less holographic image may then be used as a base line to reduce image artifacts and/or remove noise from the lens-less holographic image of the sample.

In one or more embodiments, the stationary illumination source may include a coherent light source configured to produce a divergent coherent light. In one or more embodiments, the divergent coherent light may be scattered by the object of interest in the sample to produce scattered light, which interferes with the undisturbed (un-scattered) divergent coherent light to produce interference patterns. In one or more embodiments, the lens-less holographic image of the sample captured by the stationary imaging module may include the interference patterns. In one or more embodiments, the stationary imaging module may be further configured to apply equations governing coherent light propagation for both spherical waves and planar waves in a reconstruction of the interference patterns to produce the three-dimensional details of the object.

In one or more embodiments, the interference patterns in the lens-less holographic image of the sample are processed by using a depth calibration based on a mathematical correlation between numerical magnification $m_n$ and the object-sensor distance $z_1$ that is specific to the use of either spherical wave or planar wave reconstruction algorithm and a location of the stationary image sensor and a location of stationary illumination with respect to the sample.

BRIEF DESCRIPTION OF THE DRAWINGS

For a more complete understanding of the principles disclosed herein, and the advantages thereof, reference is now made to the following descriptions taken in conjunction with the accompanying drawings, in which:

FIGS. 2A, 2B, 2C, and 2D show various configurations of a holographic imaging system, in accordance with various embodiments.

FIGS. 4A, 4B, and 4C show digital hologram, wavefront reconstruction results (obtained at five different depths (z), slot positions of $z_1$) and zoomed views of the inset regions marked by the dashed rectangles, respectively.

FIG. 5 show various numeric magnifications ($m_n$) used in spherical and planar wave reconstruction algorithms for accurate depth reconstruction versus the true magnification ($m_t$) values.

FIGS. 8A and 8B show digital holograms and wavefront reconstruction results, respectively, of a resolution test target sample placed in the $1^{st}$ slot (top row), $2^{nd}$ slot (middle row) and $3^{rd}$ slot (bottom row) of the holographic imaging device, in accordance with one or more embodiments.

FIG. 9 shows a plot of the numeric magnifications needed to retrieve the true depth of the object from the sensor, in accordance with one or more embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

In accordance with one or more embodiments, a lens-less system for holographic imaging (also referred to herein as a lens-less holographic imaging device, a lens-less holoscope instrument, a lens-less holoscope, or simply a holoscope) is provided. Throughout the disclosure, the terms "holographic imaging system" and "holographic imaging device" are used interchangeably and meant to describe the lens-less system for holographic imaging. As described herein, the disclosed holographic imaging system/device may be constructed as a low-cost, lens-less, digital inline microscope that allows a user to visualize a sample (e.g., a microscopic sample or a sample containing an object or an organism of interest) in three dimensions.

Figure 1A:
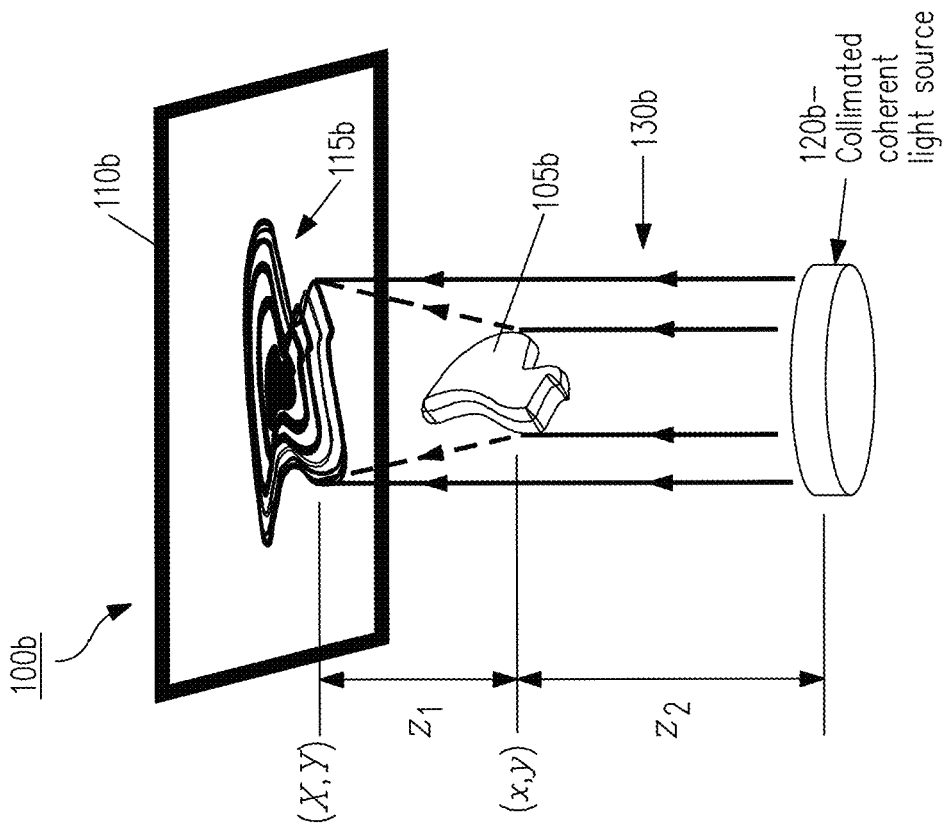
FIGS. 1A and 1B illustrate schematics of a holographic imaging system, in accordance with various embodiments.
Figure 1B:
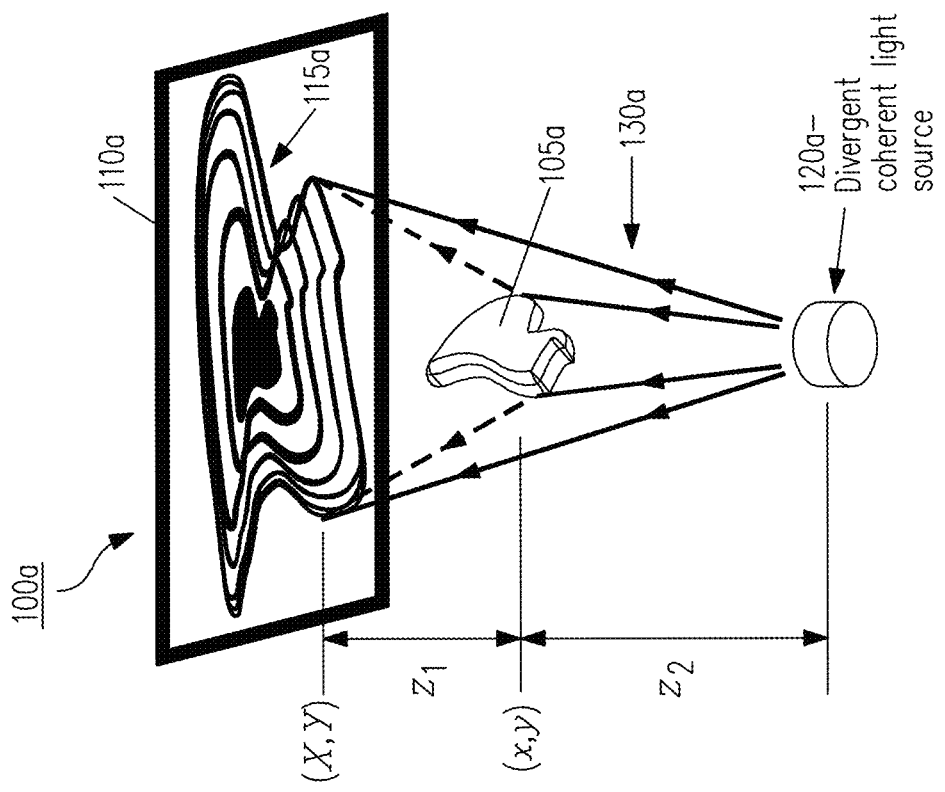

FIGS. 1A and 1B illustrate schematics of a holographic imaging system, in accordance with various embodiments. FIG. 1A depicts a schematic of a holographic imaging system 100a, in accordance with various embodiments. The illustration of FIG. 1A shows the holographic imaging system 100a configured for and used in a coherent wavefront reconstruction using spherical divergent waves, in accordance with one or more embodiments. As illustrated in FIG. 1A, the holographic imaging system 100a includes an imaging sensor 100a configured to capture an image 115a of a sample 105a comprising an object of interest. In one or more embodiments, the image sensor 100a may be stationary with respect to other components in the holographic imaging system 100a. In various embodiments, the image sensor 100a may be located at an object-sensor distance $z_1$ from the sample 105a on a first side of the sample.

As further illustrated in FIG. 1A, the holographic imaging system 100a includes an illumination source 120a configured to illuminate the sample 105a. In one or more embodiments, the illumination source 120a may be stationary with respect to other components, including the image sensor 100a within the holographic imaging system 100a. In various embodiments, the illumination source 120a may be positioned at an object-source distance $z_2$ from the sample 105a on a second side (e.g., opposite of the first side) of the sample 105a. In accordance with one or more embodiments, the illumination source 120a comprises a divergent coherent light source to illuminate the sample 105a for imaging.

As illustrated in FIG. 1A, the holographic imaging system 100a is a lens-free configuration for capturing images without any optical components used for manipulating light from the illumination source 120a. Accordingly, the holographic imaging system 100a can include the stationary image sensor 110a that can capture the image 115a (also referred to herein as a lens-less holographic image 115a since no lenses are used in manipulating the light) of the sample 105a (e.g., the object of interest) illuminated with light originating from the stationary illumination source 120a.

In one or more embodiments, the holographic imaging system 100a may include a processor (e.g., a computing device or system) configured to produce a holographic image (not shown in FIG. 1A) of the sample 105a (e.g., the object of interest) in three-dimensional details reconstructed based on the lens-less holographic image 115a of the sample 105a. As illustrated in FIG. 1A, the lens-less holographic image 115a may include interference patterns that are captured at the image sensor 110a. In accordance with one or more embodiments, the interference patterns captured in the lens-less holographic image 115a are a result of interference between scattered light and un-scattered light interfering with one another when the light from the illumination source 120a passes through the sample 105a.

Now referring to FIG. 1B, which depicts a schematic of a holographic imaging system 100b, in accordance with various embodiments. The illustration of FIG. 1B shows the holographic imaging system 100b configured for and used in a coherent wavefront reconstruction using planar collimated waves, in accordance with one or more embodiments. As illustrated in FIG. 1B, the holographic imaging system 100b includes an imaging sensor 100b configured to capture an image 115b of a sample 105b comprising an object of interest. In one or more embodiments, the image sensor 100b may be stationary with respect to other components in the holographic imaging system 100b. In various embodiments, the image sensor 100b may be located at an object-sensor distance $z_1$ from the sample 105b on a first side of the sample.

As further illustrated in FIG. 1B, the holographic imaging system 100b includes an illumination source 120b configured to illuminate the sample 105b. In one or more embodiments, the illumination source 120b may be stationary with respect to other components, including the image sensor 100b within the holographic imaging system 100b. In various embodiments, the illumination source 120b may be positioned at an object-source distance $z_2$ from the sample 105b on a second side (e.g., opposite of the first side) of the sample 105b. In accordance with one or more embodiments, the illumination source 120b comprises a collimated coherent light source to illuminate the sample 105b for imaging.

As illustrated in FIG. 1B, the holographic imaging system 100b is a lens-free configuration for capturing images without any optical components used for manipulating light from the illumination source 120b. Accordingly, the holographic imaging system 100b can include the stationary image sensor 110b that can capture the image 115b (e.g., a lens-less holographic image 115a since no lenses are used) of the sample 105b (e.g., the object) illuminated with light originating from the stationary illumination source 120b.

In one or more embodiments, the holographic imaging system 100b may include a processor (e.g., a computing device or system) configured to produce a holographic image (not shown in FIG. 1B) of the sample 105b (object) in three-dimensional details reconstructed based on the lens-less holographic image 115b of the sample 105b. As illustrated in FIG. 1B, the lens-less holographic image 115b may include interference patterns that are captured at the image sensor 110b. In accordance with one or more embodiments, the interference patterns captured in the lens-less holographic image 115b are a result of interference between scattered light and un-scattered light interfering with one another when the light from the illumination source 120b passes through the sample 105b.

Additional details regarding imaging methodologies of the disclosed holographic imaging systems 100a/100b of FIGS. 1A and 1B are further described below.

In both holographic imaging systems 100a/100b, a laser or a diode, e.g., a 654-nm laser diode, can be used as a coherent illumination source (120a/120b) to produce divergent light waves or collimated light waves for optical magnification. The lights from the illumination source are scattered due to diffraction by the sample 105a or 105b positioned at a given distance $z_1$ from the imaging sensor 110a or 110b, respectively. The scattered light can interfere with undisturbed light, forming an interferogram, also known as a hologram, comprising interference patterns, which can be captured by an imaging sensor or imaging module, such as for example, a charge-coupled device (CCD) sensor or a complementary metal-oxide semiconductor (CMOS) sensor. The lens-less nature of the disclosed holographic imaging system can enable the interference patterns to occur directly on the imaging sensor, such that the captured digital hologram may be processed numerically to reconstruct the wavefront, re-focusing it in the computational domain until the object of interest is observed, in accordance with various embodiments herein.

Even though light emitted by the illumination source 120a may be composed predominantly of divergent spherical waves, the sample can be accurately reconstructed at its true depth plane from the imaging sensor by applying a depth calibration to collimated plane wave reconstruction algorithms, in accordance with one or more embodiments disclosed herein. Furthermore, the embodiments of the techniques and methodologies described herein can illustrate capabilities of the lens-less digital holographic imaging or microscopy that can be used to perform spherical wavefront reconstruction with plane wave approximations. The lens-less (or lens-free) configuration in the holographic imaging device may help avoid optical distortions and aberrations commonly found in conventional lens-based optical systems while simultaneously preventing glaring and flaring from various optical surfaces, in accordance with one or more embodiments herein. Thus, the disclosed approach may help with reduction, or even elimination, of the number of system components, particularly the complex imaging optical components, needed to lower the overall cost of such systems.

In contrary to conventional microscope imaging that uses a physical imaging or focusing lens to form a two-dimensional image on an imaging sensor, where a depth of field equals to its focal plane, the disclosed holographic imaging device can capture a hologram that is representative of a three-dimensional (3D) volume without any of the conventionally used optical lenses. The disclosed embodiments illustrate various ways this can be achieved by applying a wavefront reconstruction to propagate through the 3D volumetric space and numerically focus the sample at any given depth plane. Furthermore, the disclosed holographic imaging device may produce the holographic image of the object of interest by applying equations governing coherent light propagation for either or both spherical waves or/and planar waves in the reconstruction. To better illustrate and describe the details of the disclosed device and methodologies for holographic imaging, reference is now made to the following descriptions taken in conjunction with the accompanying figures further below, particularly with respect to coherent wavefront reconstructions of the interference patterns using spherical and/or plane wave approximations (e.g., coherent spherical wavefront reconstruction using a plane wave approximation or coherent plane wavefront reconstruction using a spherical wave approximation).

In various embodiments, the disclosed holographic imaging system 100a/100b may include a system configuration where the illumination source, the sample/object, and the imaging sensor are placed on the same optical axis to form an in-line digital holographic imaging setup, as illustrated in FIGS. 1A and 1B. In such configurations, the illumination source 120a/120b can produce a beam of light or an incident wave for illuminating the sample 105a/105b. The incident wave, which gets scattered by the sample/object 105a/105b, and the un-scattered portion of the incident wave, referred to as the reference wave, share the same optical axis in this setup. The part of the incident wave scattered by the object produces the scattered wave, referred to as the object wave O, while the un-scattered part creates the reference wave R. In this configuration, the object and reference waves interfere behind the object plane (x, y), i.e., where the object lies along the optical axis, creating an interference pattern that can be recorded/captured as the hologram by the imaging sensor at the detector plane (X, Y), which may be positioned at a first distance, e.g., an object-sensor distance $z_1$ (also referred to as sample-sensor distance $z_1$) from the sample, whereas the illumination source is placed at a second distance, e.g., an object-source distance $z_2$ (also referred to as sample-source distance $z_2$) from the sample. The distribution of the incident wave can be represented by $U_{incident}(x, y)$ and the object can be described by a transmission function, such that:

$$t(x, y) = \exp(-a(x, y))\exp(i\phi(x, y)) \quad (1)$$

where $a(x, y)$ represents the absorption and $\phi(x, y)$ the phase distribution as the wave is scattered. The incident wave remains unchanged where there is either no object or where $a(x, y)$ and $\phi(x, y)=0$ such that the transmission function $t(x, y)=1$. If the object transmission function is described in terms of a perturbation $\tilde{t}(x, y)$ imposed on the reference wave such that:

$$t(x, y) = 1 + \tilde{t}(x, y) \quad (2)$$

the wavefront distribution beyond the object can be represented mathematically using separate contributions from the reference and object waves as:

$$U_{exit}(x, y) = U_{incident}(x, y) \cdot t(x, y) = U_{incident}(x, y) + U_{incident}(x, y) \cdot \tilde{t}(x, y) \quad (3)$$

where the first term describes the reference, and the second term describes the object wave.

The propagation of the wave towards the detector can be described using the Fresnel-Kirchhoff diffraction formula:

$$U_{detector}(X, Y) \approx -\frac{i}{\lambda} \int\int U_{incident}(x, y) \cdot t(x, y) \frac{\exp(-ik|\vec{r}-\vec{R}|)}{|\vec{r}-\vec{R}|} dx dy \quad (4)$$

wherein $\vec{r}=(x, y, z_2)$, $\vec{R}=(X, Y, z_1+z_2)$ and $|\vec{r}-\vec{R}| = \sqrt{(x-X)^2+(y-Y)^2+(z_1)^2}$ which denotes the distance between a point in the object plane and the detector plane. Before reconstruction the hologram is normalized by a background image ($B(X, Y)=|R(X, Y)|^2$) that is recorded under the same experimental conditions as the hologram, but without the presence of the object. The distribution of the normalized hologram $H_0(X, Y)$ thus does not depend on incident or reference wave intensity or detector sensitivity. The reconstruction of a digital hologram can then include a multiplication of the normalized hologram with the reference wave $R(X, Y)$ followed by back-propagation to the object plane based on the Fresnel-Kirchhoff diffraction integral:

$$U(x, y) \approx \frac{i}{\lambda} \int\int R(X, Y) H_0(X, Y) \frac{\exp(-ik|\vec{r} - \vec{R}|)}{|\vec{r} - \vec{R}|} dXdy \quad (5)$$

The reconstructed wavefront corresponds to $\tilde{t}(x, y)$ that can be added to 1 to obtain the transmission function $t(x, y)$.

In various embodiments described herein, a plane wave can be used in the calculations. For example, a plane wave can be represented by a complex-valued distribution $\exp(i(k_x x + k_y y + k_z z))$, where $k_x$, $k_y$ and $k_z$ are its vector components ($k = 2\pi/\lambda$, where $\lambda$ denotes the wavelength). $k_x = k_y = 0$ for an optical axis along the plane wave propagation and choosing $z=0$ at the object location leads to $U_{incident}(x, y) = 1$. The exit wave using Eq. (3) then follows as $U_{exit}(x, y) = t(x, y)$. Wave propagating from the object plane $(x, y)$ towards the detector plane $(X, Y)$ can be described by the Fresnel-Kirchhoff diffraction formula as:

$$U_{detector}(X, Y) \approx -\frac{i}{\lambda} \int\int t(x, y) \frac{\exp(-ik|\vec{r} - \vec{R}|)}{|\vec{r} - \vec{R}|} dXdy \quad (6)$$

Wave propagation from the object plane (x,y) towards the detector plane (X,Y) can be described by the angular spectrum method, or in other words, the propagation of its spectrum. The scattering vector components can be given as:

$$\vec{k} = \frac{2\pi}{\lambda}(\cos\varphi\sin\theta, \sin\varphi\sin\theta, \cos\theta) \quad (6)$$

where $\varphi$ and $\theta$ are the azimuthal and polar angles in the spherical coordinate system, respectively, correspond to the Fourier domain coordinates (u, v) as $\cos\varphi\sin\theta = \lambda u$ and $\sin\varphi\sin\theta = \lambda v$. $(\lambda u, \lambda v)$ are the directional cosines of the vector $\vec{k}$ and thus follow $(\lambda u)^2 + (\lambda v)^2 \leq 1$. The propagation of the exit wave to the detector plane of the imaging sensor based on angular spectrum method can transform Eq. (6) into the following equation:

$$U_{detector}(X, Y) = FT^{-1}\left[FT(t(x, y))\exp\left(\frac{2\pi i z_1}{\lambda}\sqrt{1 - (\lambda u)^2 - (\lambda v)^2}\right)\right] \quad (7)$$

where the term $$\exp\left(\frac{2\pi i z_1}{\lambda}\sqrt{1 - (\lambda u)^2 - (\lambda v)^2}\right)$$

can be simulated. The reconstruction of the hologram can then be performed by:

$$U(x, y) = FT^{-1}\left[FT(H_0(X, Y))\exp\left(-\frac{2\pi i z_1}{\lambda}\sqrt{1 - (\lambda u)^2 - (\lambda v)^2}\right)\right] \quad (8)$$

In various embodiments described herein, a spherical wave can be used in the calculations. For example, performing a similar derivation for spherical waves, the incident wave in the object plane is given by:

$$U_{incident}(x, y) = \frac{\exp(ikr)}{r} \quad (9)$$

where $\vec{r} = (x, y, z_2)$ and the object-source distance $z_2$ is the distance between the source and object plane. The exit wave based on Eq. (3) becomes:

$$U_{exit}(x, y) = U_{incident}(x, y) \cdot t(x, y) = \frac{\exp(ikr)}{r} \cdot t(x, y) \quad (10)$$

and wave propagation from the object towards the detector plane based on the Fresnel-Kirchhoff diffraction formula can be given as:

$$U_{detector}(X, Y) \approx -\frac{i}{\lambda} \int\int \frac{\exp(ikr)}{r} t(x, y) \frac{\exp(-ik|\vec{r} - \vec{R}|)}{|\vec{r} - \vec{R}|} dxdy \quad (11)$$

Using a paraxial approximation where $$r \approx z_2 + \frac{x^2 + y^2}{2z_2} \text{ and } |\vec{r} - \vec{R}| \approx (z_1 + z_2) + \frac{(x-X)^2 + (y-Y)^2}{2(z_1 + z_2)},$$

Eq. (11) can be rewritten in the form of a convolution of the transmission function:

$$U_{detector}(X, Y) \approx - \quad (12)$$

$$\frac{i}{\lambda(z_1 + z_2)z_2} \exp\left(\frac{2\pi i}{\lambda}(z_1 + 2z_2)\right) \exp\left(\frac{i\pi}{\lambda(z_1 + z_2)}(X^2 + Y^2)\right)$$

$$\int\int t(x, y) \exp\left(\frac{i\pi}{\lambda z_2}\left(\left(x - X\left(\frac{z_2}{z_1 + z_2}\right)\right)^2 + \left(y - Y\left(\frac{z_2}{z_1 + z_2}\right)\right)^2\right)\right) dxdy$$

which can be expressed in the form of a wave propagation routine that employs two Fourier transforms:

$$U_{detector}(X, Y) = FT^{-1}\left[FT(t(x, y))\exp(-i\pi\lambda z(u^2 + v^2))\right] \quad (13)$$

Reconstruction of a digital hologram with spherical waves can then be given by:

$$U(x, y) = FT\left[FT^{-1}(H_0(X, Y))\exp(i\pi\lambda z(u^2 + v^2))\right] \quad (14)$$

As illustrated in FIGS. 1A and 1B, the interference patterns captured in the lens-less holographic images 115a/115b include a fringe pattern. A typical fringe pattern is characterized by widely spaced fringes that become more and more closely spaced with distance from the first order fringe until the inter-fringe distance becomes equal to the wavelength of the light being used. The resolution is limited by the visibility of the finest interference fringes. The larger the number of fringes recorded by the imaging sensor, the higher the reconstruction resolution will be. For example, as the sample 105a/105b is moved away from the imaging sensor 110a/110b, a larger number of fringes can be resolved within the interferogram by the sensor due to higher optical magnification until the fringe period (inter-fringe distance) becomes smaller than the effective sensor pixel size. Hence, the reconstruction resolution increases for increasing sample distances from detector. However, if the sample distance is increased beyond a threshold such that the size of the fringe pattern created at that distance starts exceeding the size of the active detector region, the total number of fringes captured begin decreasing, and accordingly, the reconstruction resolution becomes worse. In one or more embodiments, the reconstruction resolution increases with distance of the sample from the detector until a threshold distance beyond which the resolution begins decreasing.

The achievable lateral resolution imposed by the diffraction limit in digital in-line holography is defined as:

$$R_{Theoretical} = \frac{\lambda z_1}{N\Delta} = \frac{\lambda z_1}{S} \quad (15)$$

where N denotes the number of pixels, $\Delta$ is the pixel size and $S=N\Delta$ is the hologram side length. In reality, the achievable resolution is governed by the mechanical stability of the optical setup which can be evaluated by analyzing the Fourier spectrum of a hologram. If the highest frequency $u_{max}$ noted in the Fourier spectrum occurs at pixel P from the spectrum center, its coordinate is given by: $u_{max}=\Delta_f P$ where $$\Delta_f = \frac{1}{N\Delta} = 1/S$$

is the pixel size in the Fourier domain. Using the classical Abbe criterion given by $$R = \frac{\lambda}{2\sin\theta_{max}}$$

where $\theta_{max}$ is the maximum possible angle of the scattered wave and the expression $\sin\theta_{max}=\lambda u_{max}$, we get:

$$R_{System} = \frac{1}{2u_{max}} = \frac{S}{2P} \quad (16)$$

Equating the theoretical resolution estimate in Eq. (15) to practical limit in Eq. (16), we obtain:

$$z_0 = \frac{1}{2P\lambda} \quad (17)$$

As the optical object-sensor distance $z_0$ at which the lateral resolution intrinsic to the digital hologram is maximized.

In the case of a divergent spherical wave, the optical object-sensor distance $z_0$ can be determined by equating the physical resolution of the system based on pixel pitch to the resolution based on the numerical aperture of the system as:

$$\frac{\Delta_p}{m_g} = \frac{\lambda}{2NA} \quad (18)$$

where $\Delta_p$ is the physical pixel pitch, $$m_g = \frac{z_1 + z_2}{z_2}$$

is the geometric magnification, $\lambda$ is the illumination wavelength and $NA=N\Delta/[2\sqrt{(N\Delta/2)^2+z_1^2}]$ is the numerical aperture of the imaging system in which N is the pixel number of the sensor. Substituting m and NA into Eq. (18) and denoting $L=z_1+z_2$ we obtain:

$$\left(\frac{N^2\Delta^4}{L^2} - \lambda^2\right)z_0^2 - \frac{2N^2\Delta^4}{L}z_0 + \left(N^2\Delta^4 - \frac{\lambda^2 N^2\Delta^2}{4}\right) = 0 \quad (19)$$

which can be simplified to get:

$$z_0 = \frac{\frac{2N^2\Delta^4}{L} \pm \lambda N\Delta\sqrt{\frac{N^2\Delta^4}{L^2} + 4\Delta^2 - \lambda^2}}{\frac{2N^2\Delta^4}{L^2} - 2\lambda^2} \quad (20)$$

Applying further approximations such that $$L \leq \frac{N\Delta^2}{\sqrt{10}\lambda}$$

and $|N^2\Delta^4/L^2| \ll 4\Delta^2$, the final solution for $z_0$ becomes:

$$z_0 = L - \frac{L^2\lambda}{N\Delta^2} \quad (21)$$

Theorical considerations for wavefront reconstruction and theory described in the preceding sections assume that the incident light waves emitted by illumination source are either completely spherical or planar. In some instances, the light waves emitted by a divergent light source are not entirely spherical or planar but are characterized by a combination of both qualities. In one or more embodiments, the composition of light waves can be determined by examining the characteristics of the light source. For wavefront reconstruction purposes, better-suited algorithms are determined for practical application. If both algorithms are unable to reconstruct the object at its true depth, a propagation depth calibration that is specific to the device design and illumination source can be developed for accurate wavefront reconstruction depth characterization, in accordance with one or more embodiments. Similarly, theoretical estimations for hologram reconstruction resolution created by perfectly plane and spherical waves may not be applied accurately to a real wave that is neither completely planar nor spherical. In one or more embodiments, determining the reconstruction resolution specific to an illumination source and device design may include an experimental analysis that entails capturing and reconstructing digital holograms for various illumination source, sample and imaging sensor distance configurations to investigate which range of distances between each component can provide a resolution that meets the application criteria. In one or more embodiments, the holographic imaging system 100a/100b may be designed and calibrated for its wavefront reconstruction algorithms to accurately obtain the true sample depth from the imaging sensor 110a/110b.

In accordance with one or more embodiments, the resolution and wavefront reconstruction algorithm can be determined based on 1) increasing distances between the sample and imaging sensor and 2) small and large distances between the source and imaging sensor. Both these elements were also explored from the perspective of developing a more ergonomic design since a larger sample-detector and source-detector distance can allow for more space to insert or retrieve a sample.

FIGS. 2A, 2B, 2C, and 2D show various embodiments of a holographic imaging system, in accordance with various embodiments. FIGS. 2A and 2B show a rendering 200a of a holographic imaging system 200b without a housing, and FIGS. 2C and 2D show a rendering 200c of a holographic imaging system 200d with an outer shell. In FIG. 2A, the holographic imaging system 200a includes a laser diode 220, which emits, e.g., 650 nm wavelength light, to create a divergent beam 222. The beam 222 passes through a glass slide 240 (or substrate 240 or cuvette 240) containing an investigation sample 205 and diffracts to produce scattered light. FIG. 2B shows slots 202 for z-translation and knobs 204 for xy-translation of the sample 205 disposed on the glass slide 240. The scattered and unscattered light interferes at an image sensor 210 to produce interference patterns, or an interferogram, also known as a digital hologram. As illustrated in FIG. 2B, the holographic imaging system 200a includes a processor 230 for computation of the interference patterns. In one or more embodiments, the processor 230 may include a Raspberry Pi small-board computer, or any other suitable computing device or system to record the digital hologram. In one or more embodiments, the processor 230 may save the digital hologram to a personal computer via an external connection. In some embodiments, the image sensor 210 may include a 12 megapixel, 1.55 μm pixel size, 1920×1080 resolution camera sensor or a 2 megapixel, 1.23 μm pixel size, 1920×1080 resolution sensor.

In one or more embodiments, the holographic imaging system 200b may include knobs 204 to manipulate the xy-translation mechanism and wavefront reconstruction resolution with respect to a small source-imaging sensor distance (e.g., object-sensor distance $z_1$+object-source distance $z_2$ as illustrated in FIGS. 1A and 1B) of 53.85 mm, as a non-limiting example. In one or more embodiments, the holographic imaging system 200b may include a larger source-imaging sensor distance (e.g., object-sensor distance $z_1$+object-source distance $z_2$ as illustrated in FIGS. 1A and 1B) of 108.70 mm, as another non-limiting example to investigate the effect of increasing sample-imaging sensor distance and the practical relevance of the spherical wave and plane wave reconstruction algorithms.

Figures 3A, 3B, 3C:
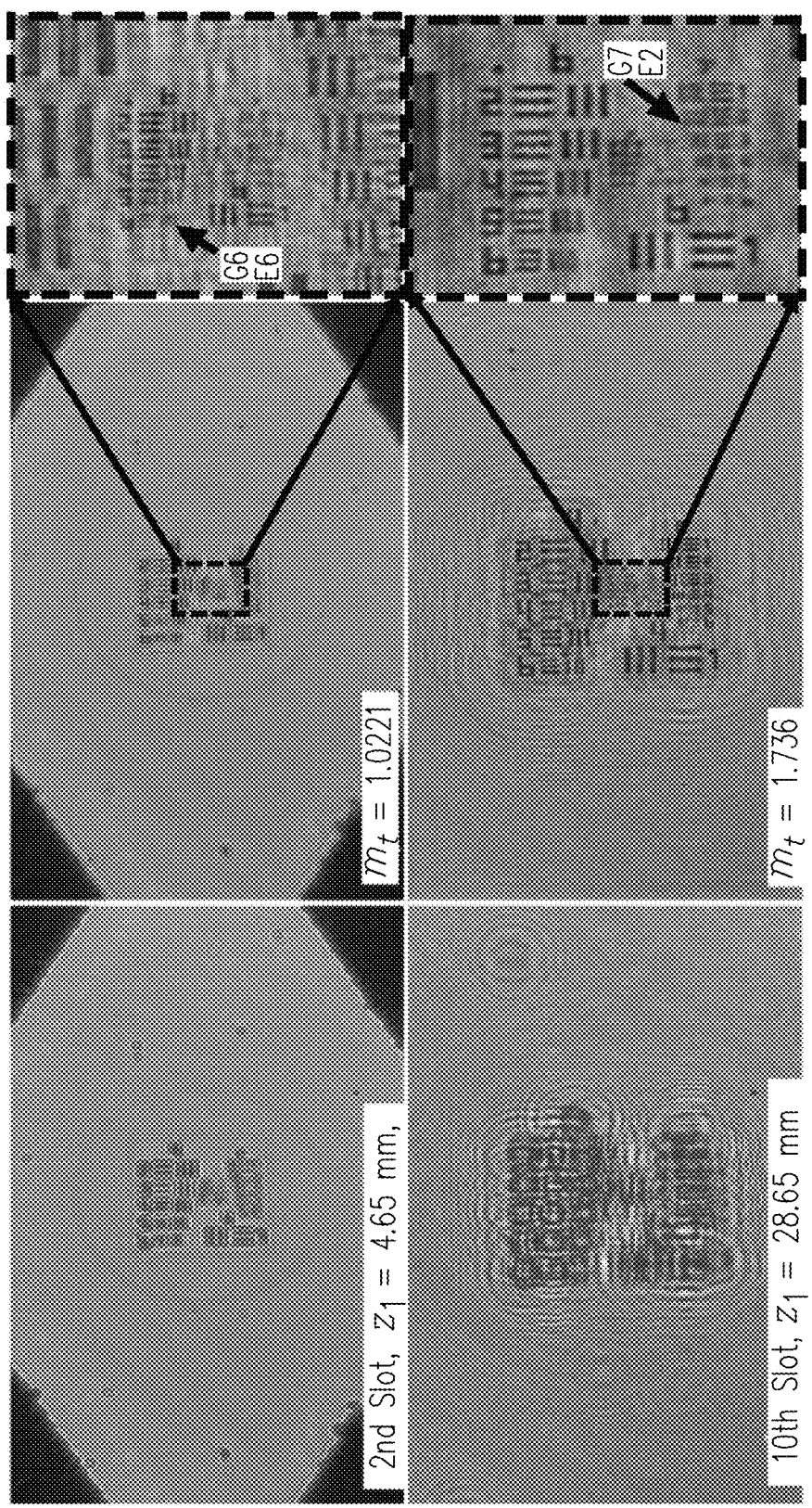
FIGS. 3A, 3B, and 3C show digital holograms, wavefront reconstruction results (obtained at two different depths (z), slot positions of $z_1$) and zoomed views of the inset regions marked by the dashed rectangles, respectively.

FIGS. 3A, 3B, and 3C show digital holograms, wavefront reconstruction results (obtained at two different depth (z) slot positions of $z_1$) and zoomed views of the inset regions marked by the dashed rectangles, respectively. The digital holograms of FIG. 3A are obtained at $z_1$ of 4.65 mm ($2^{nd}$ slot) and 28.65 mm ($10^{th}$ slot), whereas FIG. 3B show the wavefront reconstruction results at $m_p$, which denotes the true magnification of the sample, of 1.0221 and 1.736. The inset regions shown in FIG. 3C are the zoomed-in portion of the wavefront reconstruction results. In one or more embodiments, the digital holograms shown are normalized by the background image, i.e., image taken without to sample, to separate the interference fringes produced by light diffracted of the sample from the background noise. The smallest resolvable element of the sample/object in the reconstructions are indicated by the arrows (group 6 (G6) element 6 (E6), group 7 (G7) element 2 (E2)) in FIG. 3C. The sample target is placed at two depth extremes, i.e., the $2^{nd}$ slot (closest to the sensor) and the $10^{th}$ slot (furthest from the sensor). The increase in optical magnification is due to the divergent nature of the waves. More importantly, the smallest target element that can be resolved can get finer with an increase in magnification. The smallest element resolved at the $2^{nd}$ slot is found to be group 6 element 6 (or 4.38 μm) and at the $10^{th}$ slot is found to be group 7 element 2 (3.48 μm). This indicates that the reconstructions performed with this prototype have a resolution that is increasing with sample-sensor distance $z_1$, as it is still in the regime where it is dependent on the effective pixel size (or magnification).

FIGS. 4A, 4B, and 4C show digital hologram, wavefront reconstruction results (obtained at five different depths (z), slot positions of $z_1$) and zoomed views of the inset regions marked by the dashed rectangles, respectively. A similar analysis of the holograms obtained from five different depths (z), slot positions of $z_1$ designed to have a larger source-sensor distance ($z_1$+$z_2$) shows contrasting results. As observed in FIGS. 4A, 4B, and 4C, the smallest element that can be resolved at the $1^{st}$ slot is found to be group 6 element 6 (or 4.38 μm) while at the $5^{th}$ slot is noted to be group 5 element 4 (11.05 μm) even though the optical magnification increases with increasing sample-sensor distances $z_1$. In this case, the reconstruction resolution decreases with increasing sample-sensor distance $z_1$ as it is now in a regime where it dependent on the numerical aperture of the imaging sensor.

An estimate of the optimal object-sensor distance $z_0$ obtained from Eq. 21 for spherical wavefront reconstruction at which the resolution maximizes is found to be $z_0$=−0.354 m for prototype 1 and $z_0$=−2.487 m for prototype 2. Both estimates have absolute values that are much larger than the source-sensor distance permissible by each prototype design. In addition, the meaning of negative values is difficult to explain in physical terms. In estimating the optimal object-sensor distance $z_0$ for simple digital inline holographic (DIH) instruments employing divergent waves shows the impracticality of theories in determining accurate wavefront reconstruction resolution and its dependence on the source-sensor distance. The impracticality results from assumptions pertaining to ideal incident light wave properties that are not representative of incident wavefronts in real-world scenarios. Various experimental 'trial and error' designs provide results that can be used to inform the design of the disclosed holographic imaging system/device that allows for an object-sensor distance $z_1$ that is always less than optimal distance $z_0$. A distance large than $z_1$ would result in decreasing wavefront reconstruction resolutions.

In accordance with one embodiment, the practical relevance is investigated for both the planar wave and spherical wave reconstruction theory to real incident waves emitted by a divergent light source that are neither completely spherical nor completely planar. Given the true magnification of the optical waves at each slot location of the prototype device is known, based on the ratio of the true physical pixel size $\Delta_p$ and its effective size $\Delta_e$ in the resolution target reconstruction, the numeric values of magnification used in spherical and planar wave reconstruction algorithms are adjusted until the sample can be numerically focused at its true depth distance from the imaging sensor.

FIG. 5 show various numeric magnifications ($m_n$) used in spherical and planar wave reconstruction algorithms for accurate depth reconstruction versus the true magnification ($m_t$) values. In one or more embodiments, the spherical wave algorithm magnification values and the planar wave algorithm magnification values enable numerically focusing of the sample at its truc depth.

Figure 6:
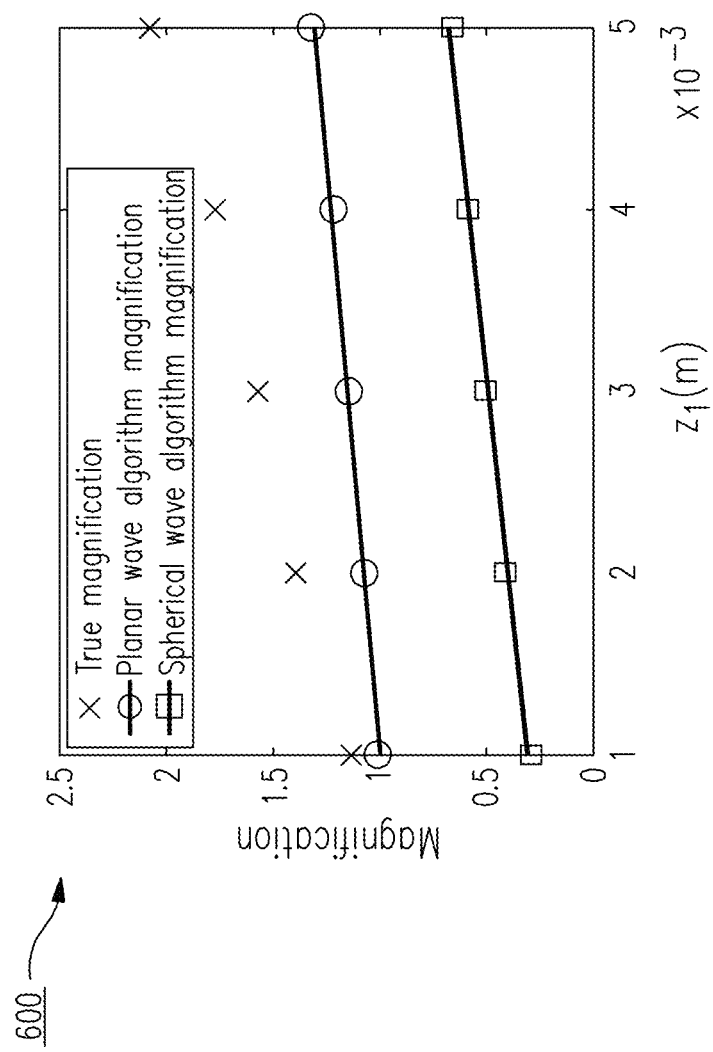
FIG. 6 depicts a plot of true magnification versus numeric magnification values for planar and spherical wave reconstruction algorithms shown in FIG. 5.

FIG. 6 depicts a plot 600 of true magnification versus numeric magnification values for planar and spherical wave reconstruction algorithms shown in FIG. 5. If either of the reconstruction algorithms is accurate, the sample can be numerically focused at its true depth using the true magnification. However, as observed, both the spherical and planar wave algorithms deviate from reality where the deviation of magnifications used by the spherical wave algorithm from the true values is significantly more than that for the planar wave algorithms. These results indicate that the planar wave algorithm can be adapted to perform reconstructions for holograms created by a divergent light source, in accordance with one or more embodiments. While the light waves are highly spherical close to the illumination source, they tend to become more and more planar, relative to the size of the object, with increasing distances. Hence, even though both the spherical and planar wave algorithms fail to reconstruct the object at its true depth using the true magnification, the deviation of the planar wave algorithm is noticeably less.

Since both the planar and spherical wave reconstruction algorithms show an increasing trend with respect to the sample-sensor distance $z_1$, a correlation between the numeric magnification $m_n$ and $z_1$ can be used to adapt either of the planar or spherical wave reconstruction algorithms for accurate depth reconstruction, in accordance with various embodiments. Since the incident waves, based on the deviation from planar and spherical wave reconstruction algorithms, are inferred to be more planar than spherical in physical nature, the planar wave reconstruction algorithm can be adapted with an $m_n$–$z_1$ correlation for wavefront reconstruction of holograms produced by a divergent light source. In terms of applied theory, the magnification (m) has direct implications on the effective pixel size of the sensor that translates to a corresponding change in the Fourier domain coordinates (u, v) used in the simulated term:

$$\exp\left(-\frac{2\pi i z_1}{\lambda}\sqrt{1-(\lambda u)^2-(\lambda v)^2}\right),$$

of Eq. (8) in the plane wave reconstruction algorithm. Contrary to an $m_n$–$z_1$ correlation, a correlation between $m_n$ and the true magnification $m_t$, based on the ratio of the true physical pixel size $\Delta_p$ and its effective size $\Delta_e$, could also be used. However, in this case, three inputs would be needed to perform an accurate reconstruction. First, using $\Delta_p$ and $\Delta_e$ to calculate $m_t$ and then using a correlation between $m_n$–$m_t$ to evaluate (u, v). In one embodiment, $m_t$ can be estimated using the geometric magnification $$m_g = \frac{z_1 + z_2}{z_2},$$

however, since the incident wave are not entirely spherical, the estimation may not be accurate. Hence, using a design and illumination specific $m_n$–$z_1$ correlation, makes accurate reconstruction much simpler.

Figure 7C:
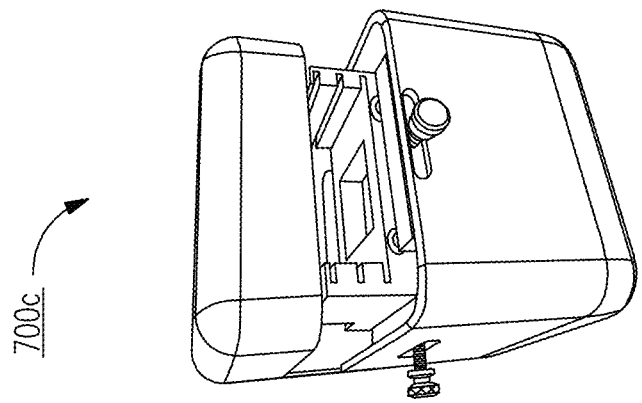
FIGS. 7A, 7B, and 7C illustrate various design configurations of a holographic imaging device, in accordance with one or more embodiments.
Figure 7B:
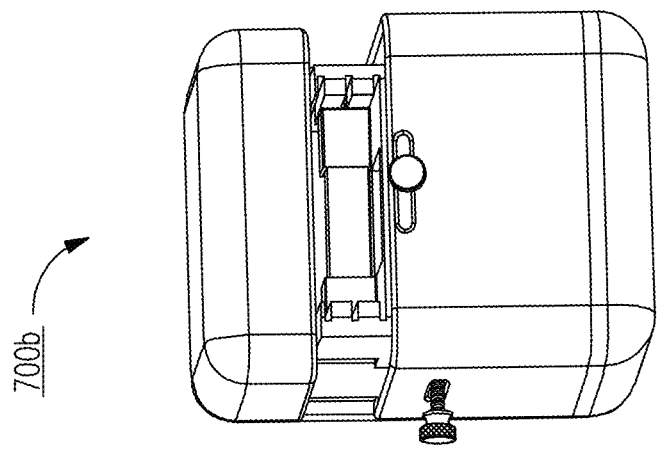
Figure 7A:
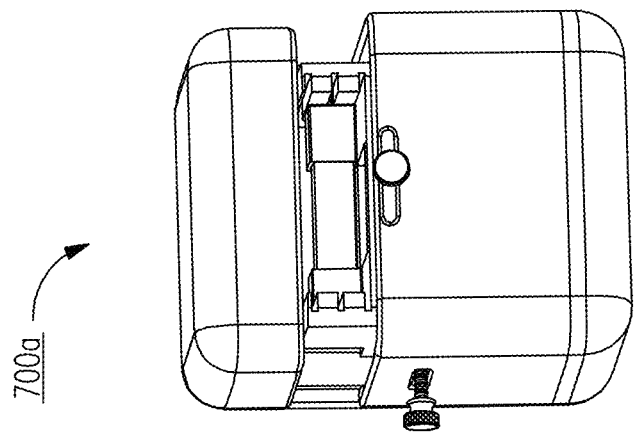

FIGS. 7A, 7B, and 7C illustrate various design configurations of a holographic imaging device, in accordance with one or more embodiments. FIG. 7A-7C depict a holographic imaging system in a 3D schematic 700a, a 3D rendering 700b, and a physical holographic imaging device 700c. As described elsewhere, the holographic imaging device includes a maximum object-sensor distance $z_1$ possible with less than the optimal object-sensor distance zo at which point the resolution maximizes. Hence, the reconstruction resolution increases with sample-sensor distance $z_1$, as it is still in the regime where it is dependent on the effective pixel size (or magnification). In one or more embodiments, the holographic imaging device includes three or ten slots for sample placement, a cuvette that can be placed in the middle slot and uses a camera that connects directly to a personal computer, such as a webcam. In one or more embodiments, the holographic imaging device can load software drivers, including a controller.

FIGS. 8A and 8B show digital holograms and wavefront reconstruction results, respectively, of a resolution test target sample placed in the $1^{st}$ slot (top row), $2^{nd}$ slot (middle row) and $3^{rd}$ slot (bottom row) of the holographic imaging device, in accordance with one or more embodiments. As illustrated, the true optical magnification increases with the object-sensor distance $z_1$. The three different slots offer sample-sensor distances of $z_1$=9.4 mm, 17.9 mm and 26.4 mm for the first, second and third slot, respectively. The total distance between the source and sensor is $z_2$=53.1 mm. Similar to the previous examples shown, in addition to the hologram of the sample, known as the object hologram, a reference hologram is captured without the sample. The object hologram is normalized by the reference hologram to separate background noise from the interference fringes produced by the sample. The sample, which is a resolution target, is numerically focused with the plane wave reconstruction algorithm (Eq. 8) by incrementally changing the numeric magnification ($m_n$), and hence the effective pixel size, until the sample comes into focus at its true depth from the sensor that is known based on the device design.

FIG. 9 shows a plot 900 of the numeric magnifications needed to retrieve the true depth of the object from the sensor of a holographic imaging system, in accordance with one or more embodiments. The correlation between numeric magnification and sample-sensor distance $z_1$ are illustrated in the plot 900. As observed, the numeric magnification $m_n$ increases with the sample-sensor distance $z_1$. A mathematical correlation that characterizes the relationship between $m_n$ and $z_1$ can be formed in form of a linear, logarithmic, power, polynomial or exponential equation that produces the best fit. The quadratic polynomial correlation between $m_n$ and $z_1$ for the holographic imaging device is determined as: $m_n=283.73z_1^2+3.19z_1+1.04$ that is valid for the maximum object-sensor distance permissible by device design. Applying this correlation in the conventional planar wave reconstruction algorithm in (Eq. 8) allows the holographic imaging device to reconstruct divergent light waves that not completely spherical nor planar waves accurately. Conversely, a correlation between $m_n$ and $z_1$ that would allow for accurate reconstructions using the spherical wavefront reconstruction algorithm (Eq. 14) is also possible, given the numerical magnification $m_n$ required with respect to increasing sample-sensor distance $z_1$ is calibrated using the spherical wavefront reconstruction algorithm. The choice of adapting the planar wavefront relative to the spherical wavefront reconstruction algorithm for use in the holographic imaging device was due to a smaller deviation, and hence error, from the true magnification input it needed to numerically focus the object at its true depth plane.

Accordingly, the lens-less system for holographic imaging or a holographic imaging system/device is provided. The design, theory, working principle and resolution limitations of an inline lens-less digital holographic microscope are presented that adapts planar wavefront reconstruction algorithms to operate with a divergent coherent illumination source. The lens-less design helps reduce the number of optical components needed, eliminate the optical aberrations, distortions, glaring and flaring effects and reduce the overall device cost. The device offers three different slots for sample placement having sample-sensor distances of $z_1=9.4$ mm, 17.9 mm and 26.4 mm, or any suitable distances. The sample can be placed on a microscope slide or in a cuvette in the form of a solution. Substrates, such as a microscope slide, can be placed in all three slots while the cuvette can be placed in the middle slot. The total distance between the source and sensor is $z_2=53.1$ mm. The digital holographic imaging system/device for three-dimensional numerical focusing enables the application of planar (or spherical) wavefront reconstruction algorithms to actual wavefronts that are not completely spherical nor planar. The methodology to apply these algorithms to real-life waves using approximations based on numerical magnification and object-sensor distance correlations is a solution for practical application of these algorithms in all digital holographic devices employing divergent wavefront for reconstruction purposes. Digital holographic devices employing divergent light rays do not necessarily need to have a lens-less configuration. However, most divergent ray devices are found to be lens-less as the divergent property of rays needed for optical magnification is inherently created by the point nature of the light source employed. Hence, optical lenses are not required to expand the beam and objective lenses are not required for magnification purposes if sufficient magnification can be achieved just by geometric dilution of light for the intended imaging application.

Figure 10:
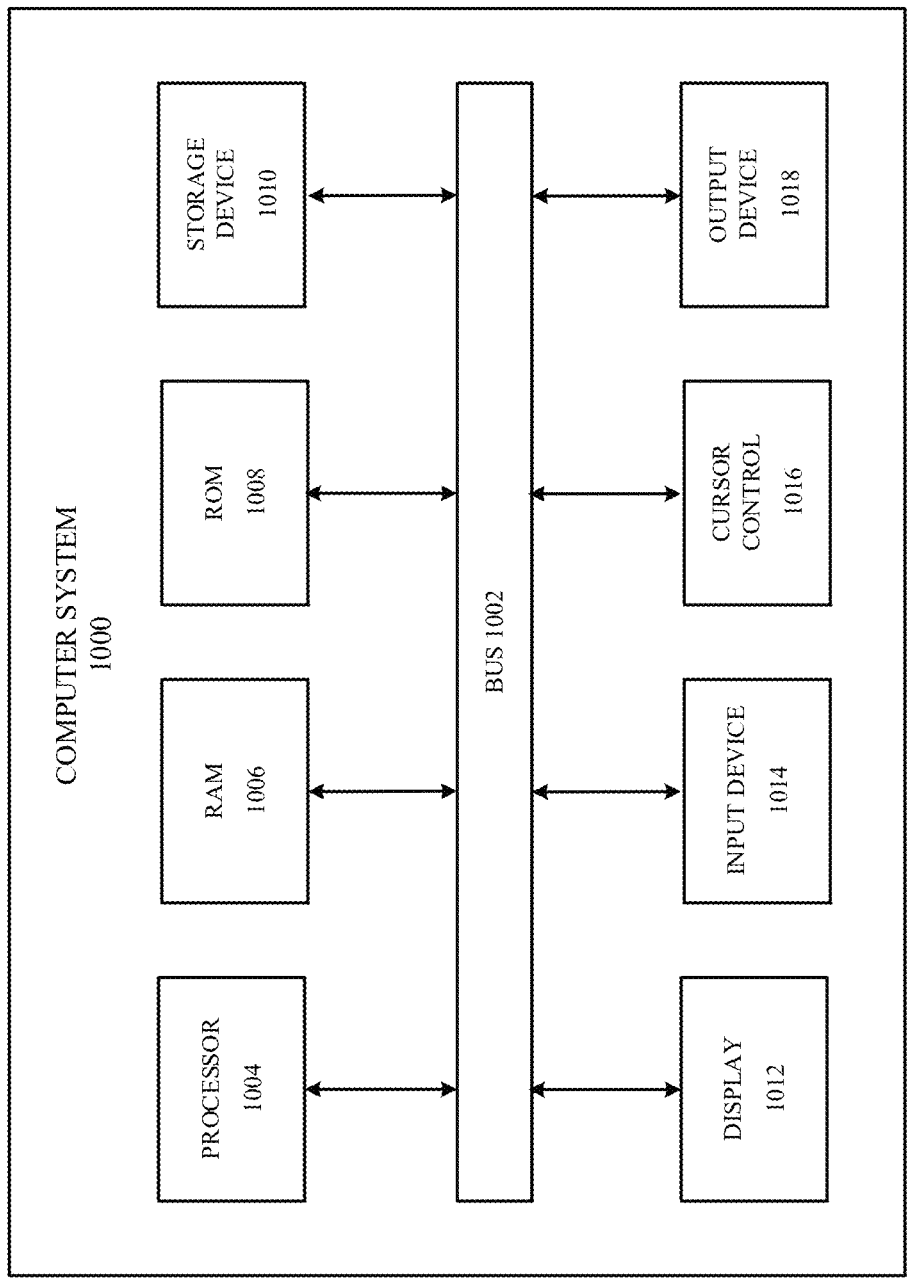
FIG. 10 is a block diagram illustrating an example computer system with which embodiments of the disclosed system and method may be implemented, in accordance with various embodiments.

FIG. 10 is a block diagram illustrating an example computer system 1000, with which embodiments of the disclosed lens-less system for holographic imaging or a holographic imaging system/device may be implemented, in accordance with various embodiments. For example, the illustrated computer system 1000 can be a local or remote computer system operatively connected to holographic imaging system/device for imaging and producing holographic images, such as those described with respect to FIGS. 1-9.

In various embodiments of the present teachings, computer system 1000 can include a bus 1002 or other communication mechanism for communicating information and a processor 1004 coupled with bus 1002 for processing information. In various embodiments, computer system 1000 can also include a memory, which can be a random-access memory (RAM) 1006 or other dynamic storage device, coupled to bus 1002 for determining instructions to be executed by processor 1004. Memory can also be used for storing temporary variables or other intermediate information during execution of instructions to be executed by processor 1004. In various embodiments, computer system 1000 can further include a read only memory (ROM) 1008 or other static storage device coupled to bus 1002 for storing static information and instructions for processor 1004. A storage device 1010, such as a magnetic disk or optical disk, can be provided and coupled to bus 1002 for storing information and instructions.

In various embodiments, computer system 1000 can be coupled via bus 1002 to a display 1012, such as a cathode ray tube (CRT) or liquid crystal display (LCD), for displaying information to a computer user. An input device 1014, including alphanumeric and other keys, can be coupled to bus 1002 for communication of information and command selections to processor 1004. Another type of user input device is a cursor control 1016, such as a mouse, a trackball or cursor direction keys for communicating direction information and command selections to processor 1004 and for controlling cursor movement on display 1012. This input device 1014 typically has two degrees of freedom in two axes, a first axis (i.e., x) and a second axis (i.e., y), that allows the device to specify positions in a plane. However, it should be understood that input devices 1014 allowing for 3-dimensional (x, y and z) cursor movement are also contemplated herein. In accordance with various embodiments, components 1012/1014/1016, together or individually, can make up a control system that connects the remaining components of the computer system to the systems herein and methods conducted on such systems, and controls execution of the methods and operation of the associated system.

In various embodiments, the computer system 1000 includes an output device 1018. In various embodiments, the output device 1018 can be a wireless device, a computing device, a portable computing device, a communication device, a printer, a graphical user interface (GUI), a gaming controller, a joy-stick controller, an external display, a monitor, a mixed reality device, an artificial reality device, or a virtual reality device.

Consistent with certain implementations of the present teachings, results can be provided by computer system 1000 in response to processor 1004 executing one or more sequences of one or more instructions contained in memory 1006. Such instructions can be read into memory 1006 from another computer-readable medium or computer-readable storage medium, such as storage device 1010. Execution of the sequences of instructions contained in memory 1006 can cause processor 1004 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 1004 for execution. Such a medium can take many forms, including but not limited to, non-volatile media, volatile media, and transmission media. Examples of non-volatile media can include, but are not limited to, dynamic memory, such as memory 1006. Examples of transmission media can include, but are not limited to, coaxial cables, copper wire, and fiber optics, including the wires that comprise bus 1002.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, another memory chip or cartridge, or any other tangible medium from which a computer can read.

In addition to computer-readable medium, instructions or data can be provided as signals on transmission media included in a communications apparatus or system to provide sequences of one or more instructions to processor 1004 of computer system 1000 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein, flow charts, diagrams and accompanying disclosure can be implemented using computer system 1000 as a standalone device or on a distributed network or shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 1000, whereby processor 1004 would execute the analyses and determinations provided by these engines, subject to instructions provided by any one of, or a combination of, memory components 1006/1008/1010 and user input provided via input device 1014.

While the present teachings are described in conjunction with various embodiments, it is not intended that the present teachings be limited to such embodiments. On the contrary, the present teachings encompass various alternatives, modifications, and equivalents, as will be appreciated by those of skill in the art. In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Figure 11:
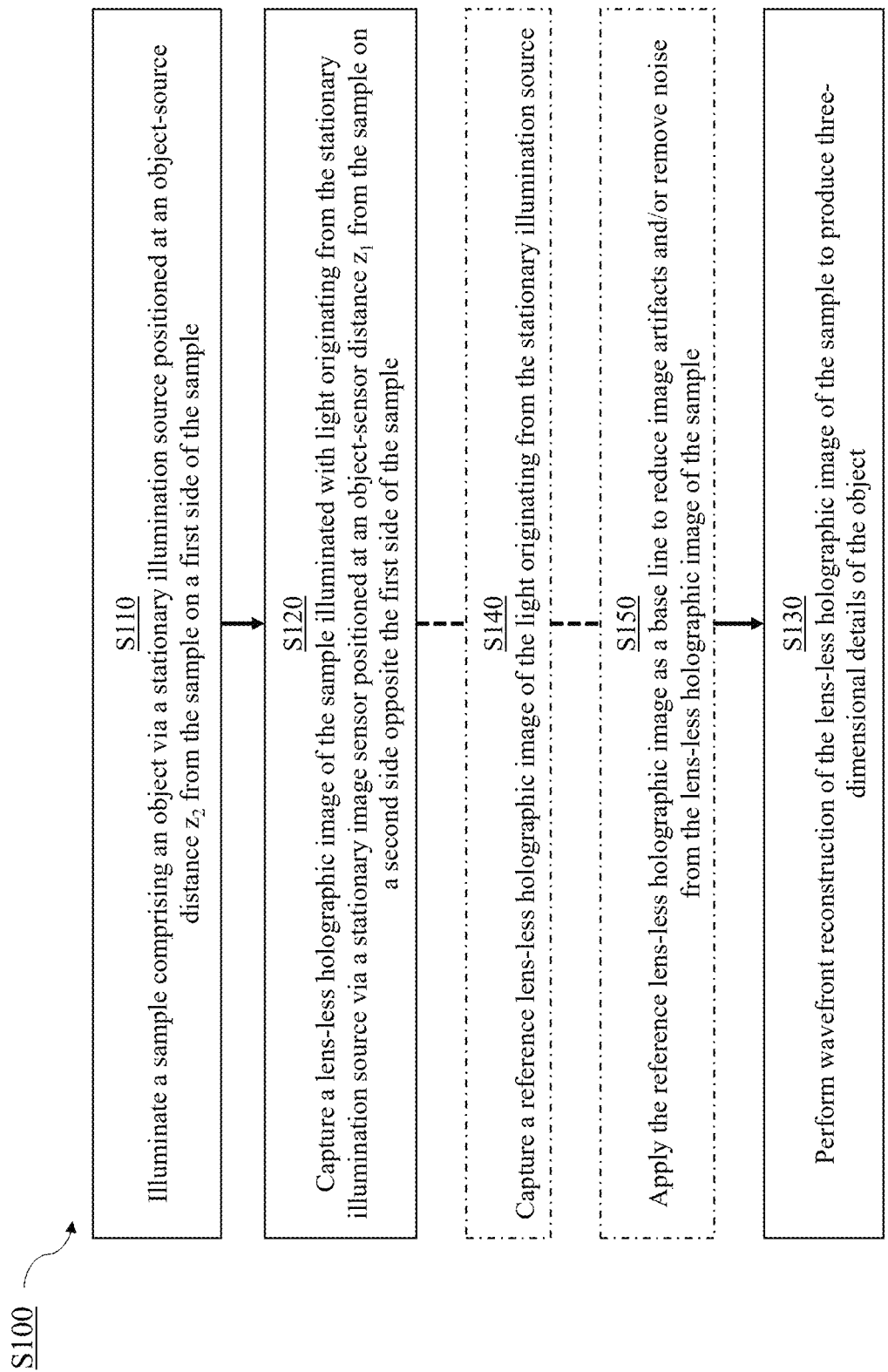
FIG. 11 illustrates a flowchart for a method of imaging, in accordance with one or more embodiments.

FIG. 11 illustrates a flowchart S100 for a method of imaging, in accordance with one or more embodiments. As illustrated in FIG. 11, the method S100 includes, at step S110, illuminating a sample having an object via a stationary illumination source positioned at an object-source distance $z_2$ from the sample on a first side of the sample; at step S120, capturing a lens-less holographic image of the sample illuminated with light originating from the stationary illumination source via a stationary image sensor positioned at an object-sensor distance $z_1$ from the sample on a second side opposite the first side of the sample; and at step S130, performing wavefront reconstruction of the lens-less holographic image of the sample to produce three-dimensional details of the object. In one or more embodiments, the sample may be disposed on a substrate, and wherein the stationary illumination source is located closer to the substrate than the sample.

As illustrated in FIG. 11, the method S100 may optionally include, at step S140, capturing a reference lens-less holographic image of the light originating from the stationary illumination source. In one or more embodiments, the sample may be disposed within a container and the method S100 may optionally include capturing a reference lens-less holographic image of the container without the sample.

Furthermore, the method S100 may optionally include, at step S150, applying the reference lens-less holographic image as a base line to reduce image artifacts and/or remove noise from the lens-less holographic image of the sample.

In various embodiments of the method S100, the stationary illumination source may include a coherent light source configured to produce a divergent coherent light, wherein the divergent coherent light is scattered by the object of interest in the sample to produce scattered light, which interferes with the undisturbed (un-scattered) divergent coherent light to produce interference patterns. In one or more embodiments, the lens-less holographic image of the sample captured by the stationary image sensor includes the interference patterns.

In various embodiments of the method S100, performing the wavefront reconstruction of the lens-less holographic image of the sample may further include applying equations governing coherent light propagation for either spherical waves or planar waves in a reconstruction of the interference patterns to obtain three-dimensional details of the object.

In various embodiments of the method S100, performing the wavefront reconstruction of the lens-less holographic image of the sample may further include applying equations governing coherent light propagation for both spherical waves and planar waves in a reconstruction of the interference patterns to produce three-dimensional details of the object.

In various embodiments, the object-source distance $z_2$ is much greater than the object-sensor distance $z_1$. In various embodiments, a ratio of the object-sensor distance $z_1$ to the object-source distance $z_2$ ranges between 0.01 and 1. In various embodiments, a ratio of the object-sensor distance $z_1$ to the object-source distance $z_2$ ranges within 10-30 percent of 0.1, 0.2, 0.3, 0.4, or 0.5.

In various embodiments, wherein performing the wavefront reconstruction of the lens-less holographic image of the sample at step S130 may include applying equations governing coherent light propagation for either spherical waves or planar waves in a reconstruction of the interference patterns in producing the three-dimensional details of the object. In one or more embodiments, wherein performing the wavefront reconstruction of the lens-less holographic image of the sample at step S130 may include applying equations governing coherent light propagation for both spherical waves and planar waves in a reconstruction of the interference patterns in producing the three-dimensional details the object. In one or more embodiments, wherein performing the wavefront reconstruction of the lens-less holographic image of the sample at step S130 may further include applying a depth calibration based on a mathematical correlation between numerical magnification $m_n$ and the object-sensor distance $z_1$ that is specific to the use of either spherical wave or planar wave reconstruction algorithm and a location of the stationary image sensor and a location of the stationary illumination source with respect to the sample.

In various embodiments, applications of the calibrated wavefront reconstruction in producing three-dimensional details of the object may include obtaining the three-dimensional edgelines, shape, geometry, morphology, phase, and location of an object within the sample. This makes the method and imaging device relevant to the analyses of object size distribution, dispersion, orientation, structure, and motion within a test sample.

EMBODIMENTS

Embodiment 1. A lens-less system for holographic imaging, comprising: a stationary image sensor configured to capture an image of a sample comprising an object of interest, the stationary image sensor being located at an object-sensor distance $z_1$ from the sample on a first side of the sample; a stationary illumination source configured to illuminate the sample positioned at an object-source distance $z_2$ from the sample on a second side opposite the first side of the sample, wherein the stationary image sensor captures a lens-less holographic image of the object illuminated with light originating from the stationary illumination source; and a processor configured to perform wavefront reconstruction of the lens-less holographic image of the sample to produce three-dimensional details of the object.

Embodiment 2. The lens-less system of embodiment 1, wherein the sample is disposed on a substrate, and wherein the stationary illumination source is located closer to the substrate than the sample.

Embodiment 3. The lens-less system of embodiments 1 or 2, wherein the stationary image sensor captures a reference lens-less holographic image of the light originating from the stationary illumination source, and wherein the reference lens-less holographic image is used as a base line to reduce image artifacts and/or remove noise from the lens-less holographic image of the sample.

Embodiment 4. The lens-less system of embodiment 1, wherein the sample is disposed within a container, wherein the stationary image sensor captures a reference lens-less holographic image of the container without the sample, and wherein the reference lens-less holographic image is used as a base line to reduce image artifacts and/or remove noise from the lens-less holographic image of the sample.

Embodiment 5. The lens-less system of any one of embodiments 1-4, wherein the stationary illumination source comprises a coherent light source configured to produce a divergent coherent light, wherein the divergent coherent light is scattered by the object of interest in the sample to produce scattered light, which interferes with the undisturbed (un-scattered) divergent coherent light to produce interference patterns, and wherein the lens-less holographic image of the sample captured by the stationary image sensor comprises the interference patterns.

Embodiment 6. The lens-less system of any one of embodiments 1-5, wherein the object-source distance $z_2$ is much greater than the object-sensor distance $z_1$.

Embodiment 7. The lens-less system of any one of embodiments 1-5, wherein a ratio of the object-sensor distance $z_1$ to the object-source distance $z_2$ ranges between 0.01 and 1 or within 10-30 percent of 0.1, 0.2, 0.3, 0.4, or 0.5.

Embodiment 8. The lens-less system of any one of embodiments 5-7, wherein the processor is further configured to apply equations governing coherent light propagation for either spherical waves or planar waves in a reconstruction of the interference patterns in producing the three-dimensional details of the object.

Embodiment 9. The lens-less system of any one of embodiments 5-7, wherein the processor is further configured to apply equations governing coherent light propagation for both spherical waves and planar waves in a reconstruction of the interference patterns in producing the three-dimensional details of the object.

Embodiment 10. The lens-less system of embodiments 8 or 9, wherein the processor is further configured to apply a depth calibration based on a mathematical correlation between numerical magnification $m_n$ and the object-sensor distance $z_1$ that is specific to the use of either spherical wave or planar wave reconstruction algorithm and a location of the stationary image sensor and a location of the stationary illumination source with respect to the sample.

Embodiment 11. A method of imaging, comprising: illuminating a sample comprising an object via a stationary illumination source positioned at an object-source distance $z_2$ from the sample on a first side of the sample; capturing a lens-less holographic image of the sample illuminated with light originating from the stationary illumination source via a stationary image sensor positioned at an object-sensor distance $z_1$ from the sample on a second side opposite the first side of the sample; and performing wavefront reconstruction of the lens-less holographic image of the sample to produce three-dimensional details of the object.

Embodiment 12. The method of embodiment 11, wherein the sample is disposed on a substrate, and wherein the stationary illumination source is located closer to the substrate than the sample.

Embodiment 13. The method of embodiments 11 or 12, further comprising: capturing a reference lens-less holographic image of the light originating from the stationary illumination source; and applying the reference lens-less holographic image as a base line to reduce image artifacts and/or remove noise from the lens-less holographic image of the sample.

Embodiment 14. The method of embodiment 11, wherein the sample is disposed within a container, the method further comprising: capturing a reference lens-less holographic image of the container without the sample; and applying the reference lens-less holographic image as a base line to reduce image artifacts and/or remove noise from the lens-less holographic image of the sample.

Embodiment 15. The method of any one of embodiments 11-14, wherein the stationary illumination source comprises a coherent light source configured to produce a divergent coherent light, wherein the divergent coherent light is scattered by the object of interest in the sample to produce scattered light, which interferes with the undisturbed (un-scattered) divergent coherent light to produce interference patterns, and wherein the lens-less holographic image of the sample captured by the stationary image sensor comprises the interference patterns.

Embodiment 16. The method of any one of embodiments 11-15, wherein the object-source distance $z_2$ is much greater than the object-sensor distance $z_1$, or a ratio of the object-sensor distance $z_1$ to the object-source distance $z_2$ ranges between 0.01 and 1 or within 10-30 percent of 0.1, 0.2, 0.3, 0.4, or 0.5.

Embodiment 17. The method of embodiments 15 or 16, wherein performing the wavefront reconstruction of the lens-less holographic image of the sample comprises applying equations governing coherent light propagation for either spherical waves or planar waves in a reconstruction of the interference patterns in producing the three-dimensional details of the object.

Embodiment 18. The method of embodiments 15 or 16, wherein performing the wavefront reconstruction of the lens-less holographic image of the sample comprises applying equations governing coherent light propagation for both spherical waves and planar waves in a reconstruction of the interference patterns in producing the three-dimensional details the object.

Embodiment 19. The method of embodiments 17 or 18, wherein performing the wavefront reconstruction of the lens-less holographic image of the sample further comprises applying a depth calibration based on a mathematical correlation between numerical magnification $m_n$ and the object-sensor distance $z_1$ that is specific to the use of either spherical wave or planar wave reconstruction algorithm and a location of the stationary image sensor and a location of the stationary illumination source with respect to the sample.

Embodiment 20. A holographic imaging device, comprising: a stationary illumination source configured to illuminate a sample comprising an object, the stationary illumination source positioned at an object-source distance $z_2$ from the sample on a first side of the sample; and a stationary imaging module configured to capture a lens-less holographic image of the sample illuminated with light originating from the stationary illumination source, the stationary imaging module being located at an object-sensor distance $z_1$ from the sample on a second side opposite the first side of the sample, wherein the stationary imaging module is further configured to perform wavefront reconstruction of the lens-less holographic image of the sample to produce three-dimensional details of the object.

Embodiment 21. The holographic imaging device of embodiment 20, wherein: the stationary imaging module is further configured to capture a reference lens-less holographic image of the light originating from the stationary illumination source, and the reference lens-less holographic image is used as a base line to reduce image artifacts and/or remove noise from the lens-less holographic image of the sample.

Embodiment 22. The holographic imaging device of embodiments 20 or 21, wherein: the stationary illumination source comprises a coherent light source configured to produce a divergent coherent light, the divergent coherent light is scattered by the object of interest in the sample to produce scattered light, which interferes with the undisturbed (un-scattered) divergent coherent light to produce interference patterns, and the lens-less holographic image of the sample captured by the stationary imaging module comprises the interference patterns.

Embodiment 23. The holographic imaging device of embodiment 22, wherein: the stationary imaging module is further configured to apply equations governing coherent light propagation for both spherical waves and planar waves in a reconstruction of the interference patterns to produce the three-dimensional details of the object, and the interference patterns in the lens-less holographic image of the sample are processed by using a depth calibration based on a mathematical correlation between numerical magnification $m_n$ and the object-sensor distance $z_1$ that is specific to the use of either spherical wave or planar wave reconstruction algorithm and a location of the stationary image sensor and a location of stationary illumination with respect to the sample.

The invention claimed is:

1. A lens-less system for holographic imaging, comprising:
a stationary image sensor configured to capture an image of a sample comprising an object of interest, the stationary image sensor being located at an object-sensor distance $z_1$ from the sample on a first side of the sample;
a stationary illumination source configured to illuminate the sample positioned at an object-source distance $z_2$ from the sample on a second side opposite the first side of the sample, wherein the stationary image sensor captures a lens-less holographic image of the object illuminated with light originating from the stationary illumination source; and
a processor configured to perform wavefront reconstruction of the lens-less holographic image of the sample to produce three-dimensional details of the object,
wherein the stationary illumination source comprises a coherent light source configured to produce a divergent coherent light, wherein the divergent coherent light is scattered by the object of interest in the sample to produce scattered light that interferes with the divergent coherent light to produce interference patterns,
wherein the lens-less holographic image of the sample captured by the stationary image sensor comprises the interference patterns, and
wherein the processor is further configured to apply equations governing coherent light propagation for both spherical waves and planar waves in a reconstruction of the interference patterns in producing the three-dimensional details of the object.

2. The lens-less system of claim 1, wherein the sample is disposed on a first surface of a substrate, and wherein the stationary illumination source is located closer to a second surface of the substrate than the sample.

3. The lens-less system of claim 1, wherein the stationary image sensor captures a reference lens-less holographic image of the light originating from the stationary illumination source, and wherein the reference lens-less holographic image is used as a base line to reduce image artifacts and/or remove noise from the lens-less holographic image of the sample.

4. The lens-less system of claim 1, wherein the sample is disposed within a container, wherein the stationary image sensor captures a reference lens-less holographic image of the container without the sample, and wherein the reference lens-less holographic image is used as a base line to reduce image artifacts and/or remove noise from the lens-less holographic image of the sample.

5. The lens-less system of claim 1, wherein the object-source distance $z_2$ is greater than the object-sensor distance $z_1$.

6. The lens-less system of claim 1, wherein a ratio of the object-sensor distance $z_1$ to the object-source distance $z_2$ ranges between 0.01 and 1 or within 10-30 percent of 0.1, 0.2, 0.3, 0.4, or 0.5.

7. The lens-less system of claim 1, wherein the processor is further configured to apply a depth calibration based on a mathematical correlation between a numerical magnification $m_n$ and the object-sensor distance $z_1$ that is specific to a use of either a spherical wave or planar wave reconstruction algorithm and a location of the stationary image sensor and a location of the stationary illumination source with respect to the sample.

8. A method of imaging, comprising:
illuminating a sample comprising an object via a stationary illumination source positioned at an object-source distance $z_2$ from the sample on a first side of the sample;
capturing a lens-less holographic image of the sample illuminated with light originating from the stationary illumination source via a stationary image sensor positioned at an object-sensor distance $z_1$ from the sample on a second side opposite the first side of the sample; and
performing wavefront reconstruction of the lens-less holographic image of the sample to produce three-dimensional details of the object,
wherein the stationary illumination source comprises a coherent light source configured to produce a divergent coherent light, wherein the divergent coherent light is scattered by the object of interest in the sample to produce scattered light that interferes with the divergent coherent light to produce interference patterns,
wherein the lens-less holographic image of the sample captured by the stationary image sensor comprises the interference patterns, and
wherein performing the wavefront reconstruction of the lens-less holographic image of the sample comprises applying equations governing coherent light propagation for both spherical waves and planar waves in a reconstruction of the interference patterns in producing the three-dimensional details the object.

9. The method of claim 8, wherein the sample is disposed on a first surface of a substrate, and wherein the stationary illumination source is located closer to a second surface of the substrate than the sample.

10. The method of claim 8, further comprising:
capturing a reference lens-less holographic image of the light originating from the stationary illumination source; and
applying the reference lens-less holographic image as a base line to reduce image artifacts and/or remove noise from the lens-less holographic image of the sample.

11. The method of claim 8, wherein the sample is disposed within a container, the method further comprising:
capturing a reference lens-less holographic image of the container without the sample; and
applying the reference lens-less holographic image as a base line to reduce image artifacts and/or remove noise from the lens-less holographic image of the sample.

12. The method of claim 8, wherein the object-source distance $z_2$ is greater than the object-sensor distance $z_1$, or a ratio of the object-sensor distance $z_1$ to the object-source distance $z_2$ ranges between 0.01 and 1 or within 10-30 percent of 0.1, 0.2, 0.3, 0.4, or 0.5.

13. The method of claim 8, wherein performing the wavefront reconstruction of the lens-less holographic image of the sample further comprises applying a depth calibration based on a mathematical correlation between a numerical magnification $m_n$ and the object-sensor distance $z_1$ that is specific to a use of either a spherical wave or planar wave reconstruction algorithm and a location of the stationary image sensor and a location of the stationary illumination source with respect to the sample.

14. A holographic imaging device, comprising:
a stationary illumination source configured to illuminate a sample comprising an object, the stationary illumination source positioned at an object-source distance $z_2$ from the sample on a first side of the sample; and
a stationary imaging module configured to capture a lens-less holographic image of the sample illuminated with light originating from the stationary illumination source, the stationary imaging module being located at an object-sensor distance $z_1$ from the sample on a second side opposite the first side of the sample,
wherein:
the stationary imaging module is further configured to perform wavefront reconstruction of the lens-less holographic image of the sample to produce three-dimensional details of the object,
the stationary illumination source comprises a coherent light source configured to produce a divergent coherent light,
the divergent coherent light is scattered by the object of interest in the sample to produce scattered light that interferes with the divergent coherent light to produce interference patterns,
the lens-less holographic image of the sample captured by the stationary imaging module comprises the interference patterns, and
the stationary imaging module is further configured to apply equations governing coherent light propagation for both spherical waves and planar waves in a reconstruction of the interference patterns to produce the three-dimensional details of the object.

15. The holographic imaging device of claim 14, wherein:
the stationary imaging module is further configured to capture a reference lens-less holographic image of the light originating from the stationary illumination source, and
the reference lens-less holographic image is used as a base line to reduce image artifacts and/or remove noise from the lens-less holographic image of the sample.

16. The holographic imaging device of claim 14, wherein:
the interference patterns in the lens-less holographic image of the sample are processed by using a depth calibration based on a mathematical correlation between a numerical magnification $m_n$ and the object-sensor distance $z_1$ that is specific to a use of either a spherical wave or planar wave reconstruction algorithm and a location of the stationary image sensor and a location of stationary illumination with respect to the sample.

17. The lens-less system of claim 1, wherein the sample is disposed on a first surface of a substrate, and wherein the stationary illumination source is located closer to the sample than a second surface of the substrate.

18. The method of claim 8, wherein the sample is disposed on a first surface of a substrate, and wherein the stationary illumination source is located closer to the sample than a second surface of the substrate.

* * * * *